United States Patent
Ogawa

(10) Patent No.: US 10,710,379 B2
(45) Date of Patent: Jul. 14, 2020

(54) PRINTER, PRINTING CONTROL METHOD OF PRINTER, AND RECORDING MEDIUM

(71) Applicant: CASIO COMPUTER CO., LTD., Shibuya-ku, Tokyo (JP)

(72) Inventor: Naoki Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 175 days.

(21) Appl. No.: 16/050,430

(22) Filed: Jul. 31, 2018

(65) Prior Publication Data

US 2019/0039387 A1    Feb. 7, 2019

(30) Foreign Application Priority Data

Aug. 2, 2017   (JP) .................. 2017-150042

(51) Int. Cl.
 *B41J 3/407*   (2006.01)
 *G06K 15/02*   (2006.01)
 *H04N 1/60*    (2006.01)

(52) U.S. Cl.
 CPC .......... *B41J 3/4075* (2013.01); *G06K 15/022* (2013.01); *G06K 15/027* (2013.01); *G06K 15/028* (2013.01); *H04N 1/6027* (2013.01); *G06K 2215/0097* (2013.01)

(58) Field of Classification Search
 CPC .................................................... B41J 3/4075
 USPC ........................................................ 400/208
 See application file for complete search history.

(56) References Cited

U.S. PATENT DOCUMENTS

| 5,150,977 | A | * | 9/1992 | Yoshikawa | B41J 29/46 400/249 |
|---|---|---|---|---|---|
| 5,584,591 | A | | 12/1996 | Mori et al. | |
| 5,743,664 | A | * | 4/1998 | Small | B41J 17/36 400/240 |
| 6,357,941 | B1 | * | 3/2002 | Amano | B41J 3/4075 400/613 |
| 6,603,564 | B1 | * | 8/2003 | Miyaki | B41J 2/2128 358/1.12 |
| 2002/0048478 | A1 | * | 4/2002 | Klinefelter | B41J 17/36 400/240.3 |
| 2007/0020010 | A1 | * | 1/2007 | Maruyama | B41J 11/0005 400/208 |

FOREIGN PATENT DOCUMENTS

JP         H07164712 A    6/1995

* cited by examiner

*Primary Examiner* — Anthony H Nguyen
(74) *Attorney, Agent, or Firm* — Holtz, Holtz & Volek PC

(57) ABSTRACT

A printer includes:
a print head that performs printing on a print medium of a conveyance object having the print medium and a member other than a print medium having mutually different colors or color brightness levels on regions on one side;
a detector to detect a color or color brightness of the conveyance object at a detection position; and
a processor.
When there is a change in the color or color brightness as a first detection result as compared with the color or color brightness as a second detection, the processor updates a held value, and does not update the held value when there is no change.
The processor determines whether there is a change in a detection value as compared with the updated held value or a previous held value not updated. When determining that there is no change, the processor stops printing.

16 Claims, 8 Drawing Sheets

FIG. 7A
FIG. 7B
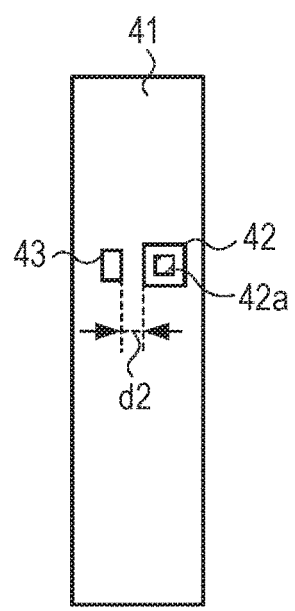
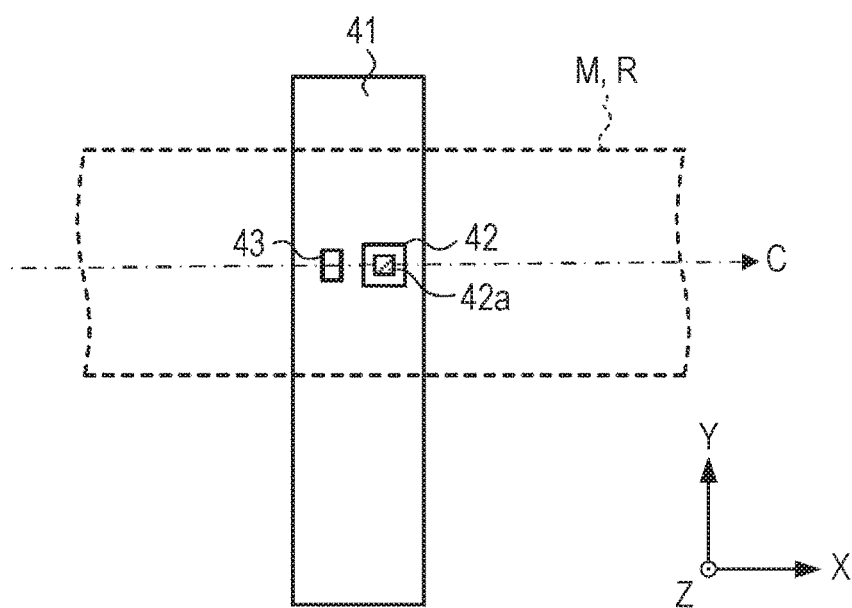

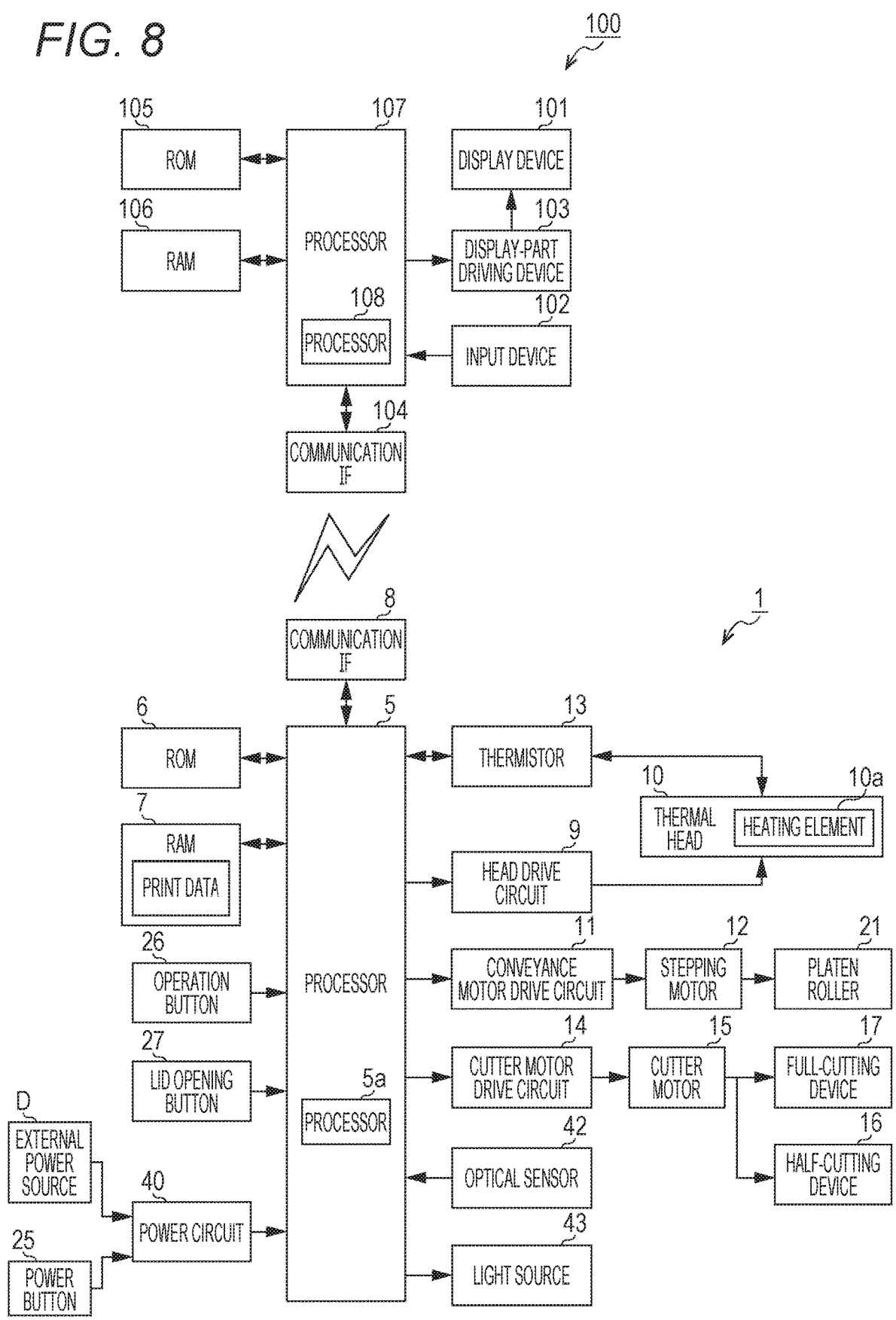

PRINTER, PRINTING CONTROL METHOD OF PRINTER, AND RECORDING MEDIUM

CROSS REFERENCE TO RELATED APPLICATIONS

This application is based upon and claims the benefit of priority from the prior Japanese Patent Application No. 2017-150042, filed Aug. 2, 2017, the entire contents of which are incorporated herein by reference.

BACKGROUND

1. Technical Field

This specification relates to a printer, a printing control method of a printer, and a recording medium.

2. Related Art

Conventionally, there is known a printer (label printer) configured to create a printing tape piece (label) printed with characters or the like by printing characters or the like on a long print medium such as a printing tape and then cutting the print medium, and there is known a storage body (tape cassette) that contains a print medium to be used for the printer.

JP 07-164712 A discloses a printer having a function capable of detecting replacement of a storage body storing a print medium, during operation of the printer in such a printer.

SUMMARY

A printer according to one aspect of the present invention includes:

a print head that performs printing on a print medium of a conveyance object having the print medium and a member other than a print medium that have mutually different colors included in respective regions at least on one each side, or have mutually different levels of color brightness in respective regions at least on one each side;

a detector configured to detect a color or color brightness of the conveyance object at a detection position; and a processor.

When there is a change in the color or color brightness as a first detection result detected by the detector after conveyance of the conveyance object, as compared with the color or color brightness as a second detection result detected by the detector before conveyance of a conveyance object, the processor updates a held value indicating a value of the color or color brightness of the conveyance object after conveyance, and the processor does not update the held value when there is no change.

Thereafter, in response to a print instruction and based on a new second detection result detected by the detector before new conveyance, the processor determines whether there is a change in a detection value obtained by detecting a color or color brightness of a conveyance object before conveyance, as compared with the held value updated according to the first detection result or with a previous held value that has not been updated. When determining that there is no change, the processor regards that there is no remaining amount of the print medium and stops printing.

A printer according to another aspect of the present invention includes:

a print head that performs printing on a print medium of a conveyance object having the print medium and a member other than a print medium that have mutually different colors included in respective regions at least on one each side, or have mutually different levels of color brightness in respective regions at least on one each side;

a detector configured to detect a color or color brightness of the conveyance object at a detection position;

a processor; and a first storage device provided with a flag area.

When there is a change in the color or color brightness as a first detection result detected by the detector after conveyance of the conveyance object, as compared with the color or color brightness as a second detection result detected by the detector before conveyance of a conveyance object, the processor updates a held value indicating a value of the color or color brightness of the conveyance object after conveyance and turns ON a flag in the flag area, and the processor does not update the held value when there is no change.

Thereafter, when the flag in the flag area is ON, in response to a print instruction and based on a new second detection result detected by the detector before new conveyance, the processor executes a determination process to determine whether there is a change in a detection value obtained by detecting a color or color brightness of a conveyance object, as compared with the held value updated according to the first detection result or a previous held value that has not been updated. When determining that there is no change, the processor regards that there is no remaining amount of the print medium and stops printing.

A printing control method of a printer according to one aspect of the present invention includes the steps of:

updating a held value indicating a value of a color or color brightness of a conveyance object after conveyance when there is a change in the color or color brightness as a first detection result detected after conveyance of the conveyance object, as compared with the color or color brightness as a second detection result detected by a detector before conveyance of a conveyance object, but not updating the held value when there is no change, in which the conveyance object has a print medium and a member other than a print medium that have mutually different colors included in respective regions at least on one each side, or have mutually different levels of color brightness in respective regions at least on one each side; and then, determining, in response to a print instruction and based on a new second detection result detected before new conveyance, whether there is a change in a detection value obtained by detecting a color or color brightness of a conveyance object before conveyance, as compared with the held value updated according to the first detection result or a previous held value that has not been updated, and stopping printing as regarding that there is no remaining amount of the print medium when determining that there is no change.

A non-transitory computer-readable recording medium storing a program of a printer according to one aspect of the present invention causes a computer to execute the steps of:

updating a held value indicating a value of a color or color brightness of a conveyance object after conveyance when there is a change in the color or color brightness as a first detection result detected after conveyance of the conveyance object, as compared with the color or color brightness as a second detection result detected by a detector before conveyance of a conveyance object, but not updating the held value when there is no change, in which the conveyance object has a print medium and a member other than a print medium that have mutually different colors included in respective regions at least on one each side, or have mutually different levels of color brightness in respective regions at least on one each side; and then, determining, in response to a print instruction and based on a new second detection result detected before new conveyance, whether there is a change in a detection value obtained by detecting a color or color brightness of a conveyance object before conveyance, as compared with the held value updated according to the first detection result or a previous held value that has not been updated, and stopping printing as regarding that there is no remaining amount of the print medium when determining that there is no change.

BRIEF DESCRIPTION OF THE DRAWINGS

FIG. 7A is a front view of a tape end detector of the printer, and FIG. 7B is a view showing a state where the print medium extending along a conveying path is arranged to cover an optical sensor and a light source of the tape end detector;

FIG. 8 is a block diagram showing a hardware configuration of the printer and an electronic device;

DETAILED DESCRIPTION

First Embodiment

Figure 1:
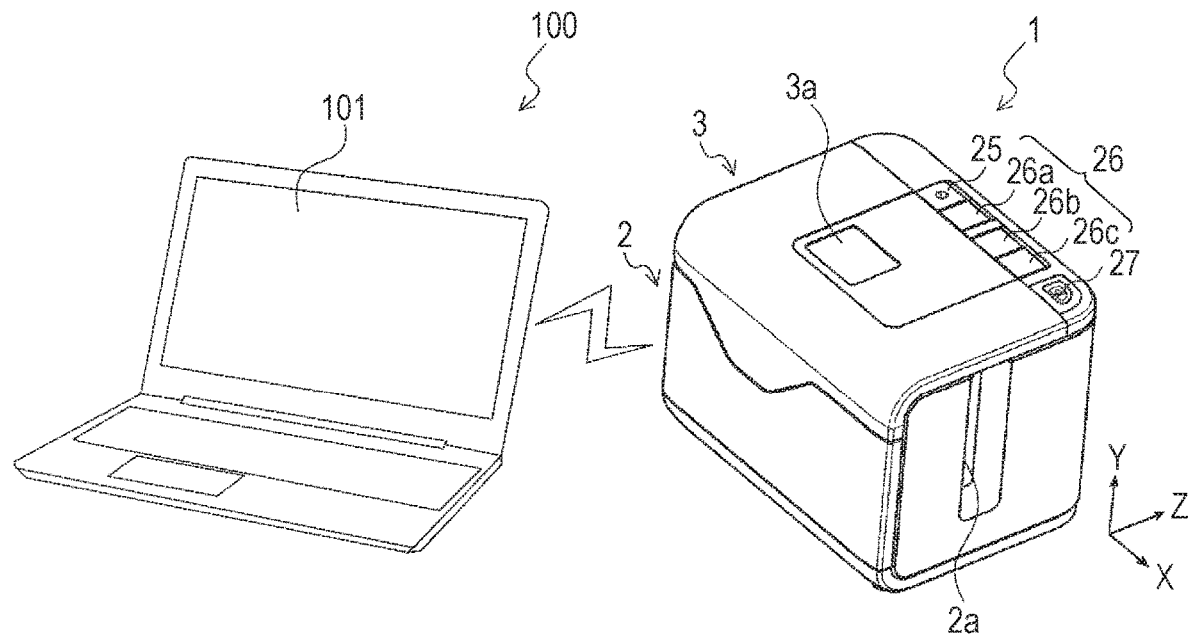
FIG. 1 is a view illustrating a configuration of a printing system including a printer.
Figure 2:
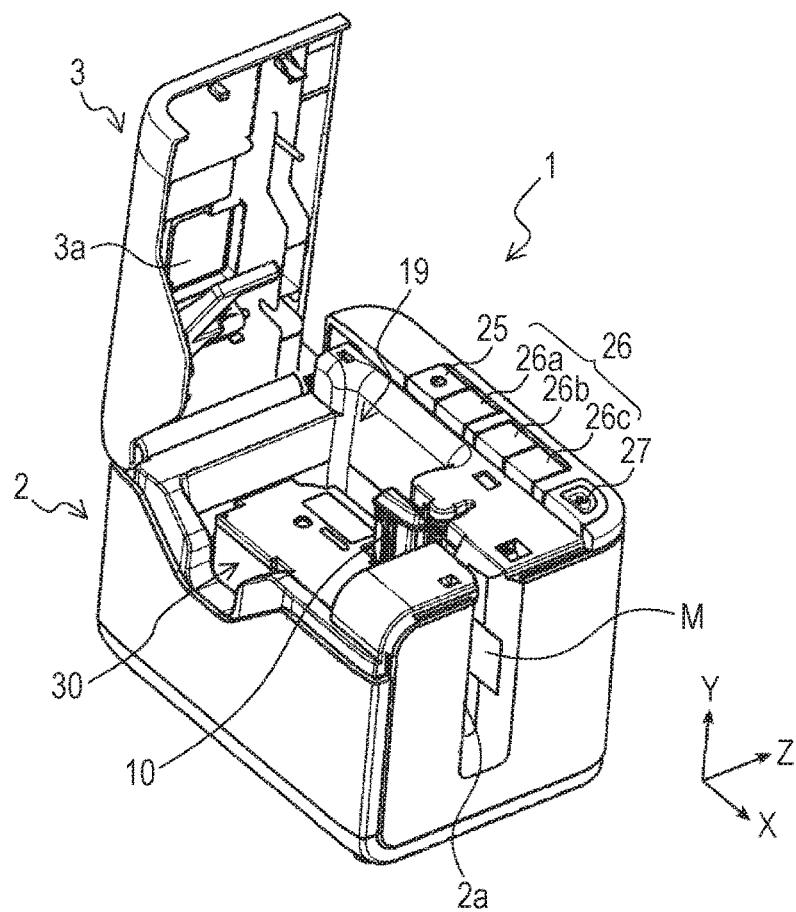
FIG. 2 is a perspective view of the printer with an openable lid opened.

FIG. 1 is a view illustrating a configuration of a printing system including a printer according to a first embodiment. FIG. 2 is a perspective view of the printer with an openable lid opened. The printing system shown in FIG. 1 includes a printer 1 and an electronic device 100 configured to transmit print data to the printer 1. The printer 1 and the electronic device 100 exchange data through wireless communication or wired communication.

In the present embodiment, a direction in which a print medium M (printing tape) is conveyed is defined as "conveying direction X", a width direction of the print medium M (printing tape) orthogonal to the conveying direction X is defined as "medium width direction Y", and a thickness direction of the print medium M (printing tape) is defined as "thickness direction Z". The X-direction, the Y-direction, and the Z-direction are orthogonal to each other.

Figure 3:
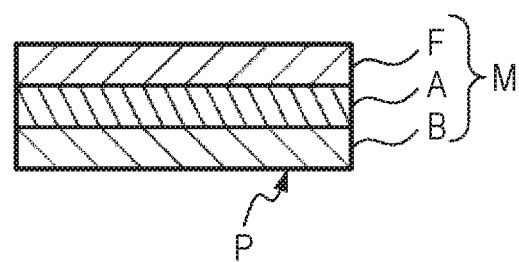
FIG. 3 is a cross-sectional view of a print medium that is used in the printer, as viewed from a medium width direction.

The printer 1 is a printer including a thermal head (print head) that performs printing on a print medium, and for example, it is a label printer that performs single-pass printing on a long strip-shaped print medium M. FIG. 3 is a cross-sectional view of the print medium M that is used in the printer 1, as viewed from the medium width direction Y. The print medium M is, for example, a long tape member having: an opaque base material B; a substantially transparent adhesive material A (paste surface) applied on the base material B; and a release film F (release paper) releasably affixed to the base material B via the adhesive material A. The release film F may be, for example, a base film made of a resin that is easily releasable from the adhesive material A, or a base paper with a surface provided with a layer that is easily releasable from the adhesive material A. The print medium M may be a long tape member without the release film F. The adhesive material A is substantially transparent.

In the present embodiment, a thermal head 10 performs printing on a surface (a surface of the base material B, hereinafter referred to as "printing surface P") opposite to a side applied with the adhesive material A on the base material B. Hereinafter, a thermal transfer label printer using an ink ribbon will be described as an example, but a printing method is not particularly limited. In the present embodiment, one surface of the print medium (second member) M and one surface of an ink ribbon (first member) R are layered in a same direction, and the print medium M and the ink ribbon R are conveyed along the conveying direction X in a state where a length direction of the print medium M and the ink ribbon R is substantially parallel to the conveying path. Hereinafter, when a conveyance object is not distinguished in a state where the print medium M and the ink ribbon R are layered, it is also simply referred to as a conveyance object. Colors (hues or saturations) included in respective regions at least on one each side of the first member and the second member are different from each other, or color brightness levels (luminosity levels) in the respective regions at least on one each side are different from each other.

As shown in FIGS. 1 and 2, the printer 1 includes a device housing 2 and an openable lid 3 that is attached to the device housing 2 to be freely opened and closed. As shown in FIG. 2, the device housing 2 includes a cassette storage (storage) 19 that stores a tape cassette (storage body) 30 inside. Details of the cassette storage 19 will be described later.

On an upper surface of the device housing 2, in addition to a power button 25, there are disposed operation buttons 26a, 26b, and 26c (hereinafter referred to as "operation button 26") to perform various operations, a lid opening button 27 to open the openable lid 3, and the like.

When the power button 25 is pressed in a state where an external power source D (see FIG. 8) is connected (that is, in a state where an AC adapter is connected), a signal is transmitted to a power circuit 40 (see FIG. 8), and the power of the printer 1 is turned ON. Then, when the power button 25 is pressed again while the power is ON, a signal is transmitted to the power circuit 40, and the power of the printer 1 is turned OFF. Further, when the operation button 26 and the lid opening button 27 are pressed, a signal is transmitted to a processor 5 or a processor 5a as a computer (see FIG. 8), and a process corresponding to each button is executed. In addition to the external power source, the printer 1 may be driven by storing a replaceable internal power source such as a dry battery.

Although not shown, the device housing 2 is provided with a power cord connection terminal, an external device connection terminal, a recording medium insertion port, and the like. When the printer 1 is to operate with an internal power source such as a battery, the power cord connection terminal may not be provided. Further, when the printer 1 can be used without connecting to an external device such as a personal computer or various terminal devices, or when the printer 1 is configured to be wirelessly connectable to an external device, the external device connection terminal may not be provided.

The openable lid 3 is arranged to be openable and closable to cover an upper portion of the cassette storage 19. The openable lid 3 is opened by pressing the lid opening button 27.

In order to enable visual check as to whether or not the tape cassette 30 (see FIG. 4) is stored in the cassette storage 19 even when the openable lid 3 is closed, the openable lid 3 is formed with a transparent window 3a.

Further, at a portion located on a side surface of the device housing 2 on a downstream side in the conveying direction X of the print medium M, a discharge port 2a is formed. The print medium M subjected to printing by the thermal head 10 in the printer 1 is discharged from the discharge port 2a to outside the printer 1.

Figure 4:
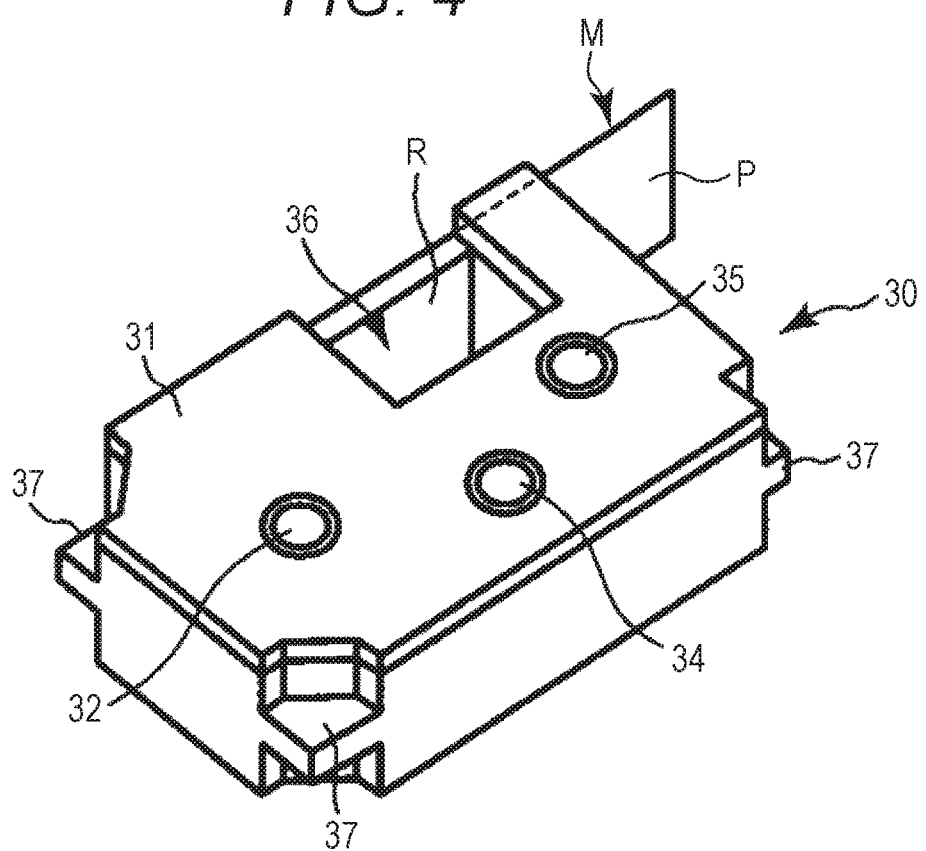
FIG. 4 is a perspective view of a tape cassette to be stored in the printer.
Figure 5:
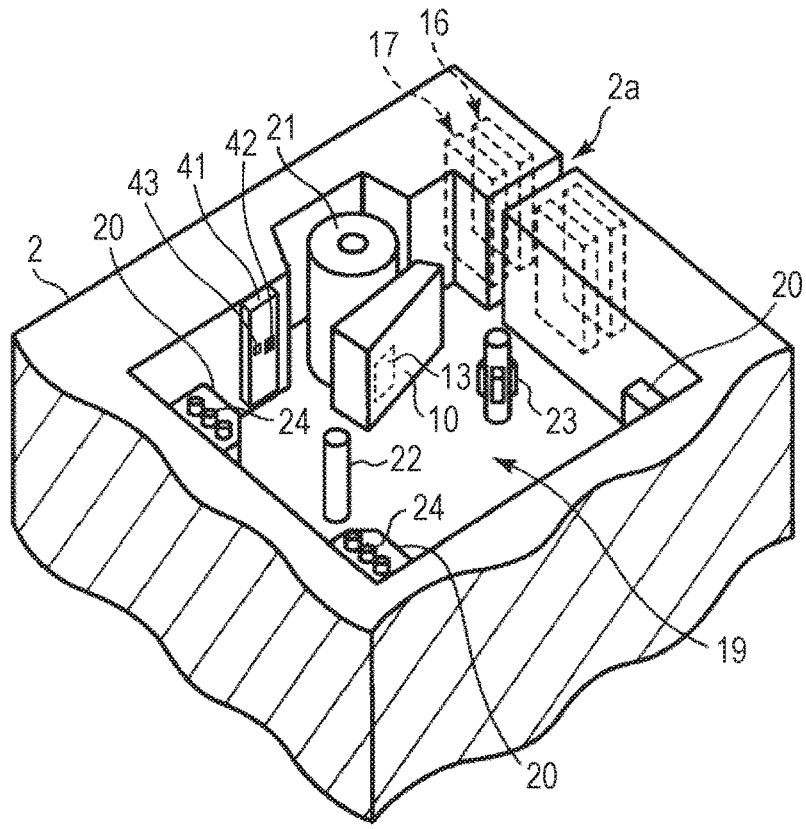
FIG. 5 is a perspective view of a cassette storage of the printer.
Figure 6:
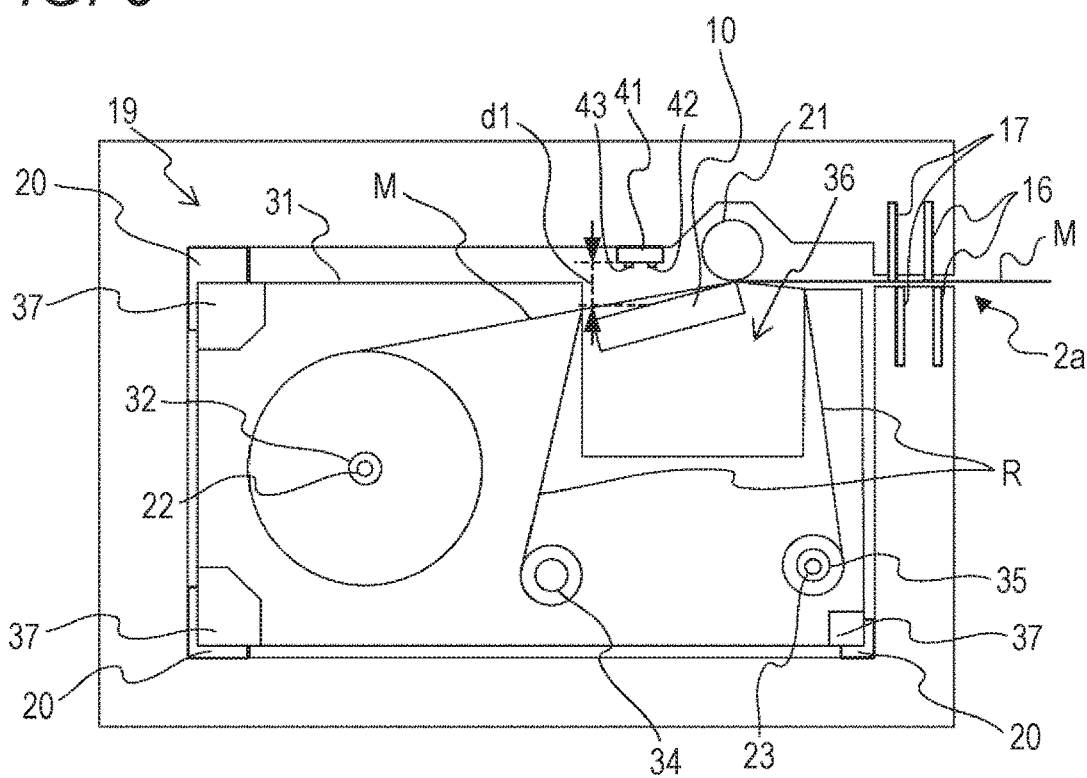
FIG. 6 is a cross-sectional view of a principal part of the printer.

FIG. 4 is a perspective view of the tape cassette 30 to be stored in the printer 1. FIG. 5 is a perspective view of the cassette storage 19 of the printer 1. FIG. 6 is a cross-sectional view of a principal part of the printer 1 according to the present embodiment. The tape cassette 30 shown in FIG. 4 is detachably and replaceably stored in the cassette storage 19 shown in FIG. 5. FIG. 6 illustrates a state where the tape cassette 30 is stored in the cassette storage 19.

As shown in FIG. 4, the tape cassette 30 has a cassette case 31 that is formed with a thermal head inserted part 36 and an engagement part 37, and stores the print medium M and the ink ribbon R. In the cassette case 31, there are provided a tape core 32, an ink ribbon supply core 34, and an ink ribbon winding core 35. The print medium M is wound in a roll shape around the tape core 32 inside the cassette case 31. The ink ribbon R for thermal transfer is wound in a roll shape around the ink ribbon supply core 34 inside the cassette case 31 with a tip of the ink ribbon R wound around the ink ribbon winding core 35. A length in the length direction of the ink ribbon R wound in a roll shape around the ink ribbon supply core 34 in an initial state is set longer than a length in the length direction of the print medium M wound in a roll shape around the tape core 32 in an initial state. A position of an end of the ink ribbon R to be finally conveyed to near a tape end detector 41 (described later) is set to be on an upstream side in the conveying direction X from a position of an end of the print medium M to be similarly conveyed to near the tape end detector 41.

As shown in FIG. 5, in the cassette storage 19 of the device housing 2, there are provided a plurality of cassette receivers 20 to support the tape cassette 30 at a predetermined position.

The cassette storage 19 is further provided with: the thermal head 10 that has a plurality of heating elements and performs printing on the print medium M; a platen roller 21 serving as a conveyance mechanism to convey the print medium M; a tape core engaging shaft 22; and an ink ribbon winding drive shaft 23. Further, a thermistor 13 is buried in the thermal head 10. The thermistor 13 is a head temperature measurement part that measures a temperature of the thermal head 10.

The cassette storage 19 of the printer 1 is further provided with the tape end detector 41 having a configuration for determining the presence or absence of a remaining amount of the print medium M. FIGS. 7A and 7B are front views of the tape end detector 41 of the printer 1. As shown in FIG. 7A, the tape end detector 41 is provided with an optical sensor 42 and a light source (irradiation device) 43. The optical sensor 42 has a light receiving region 42a to receive reflected light of the light source 43. The tape end detector 41 provided with the optical sensor 42 and the light source 43 is disposed on an upstream side from the thermal head 10 in the conveying direction X of the print medium M on the conveying path C shown in FIG. 7B. Therefore, before printing is started by the thermal head 10, the light emitted by the light source 43 toward the conveyance object becomes reflected light corresponding to a color or color brightness of the conveyance object. Then, detecting the reflected light by the optical sensor 42 enables determination as to whether or not an end E, which is one of boundaries of the print medium M, has already passed a detection position S by the optical sensor 42, that is, enables determination as to whether or not a remaining amount of the print medium M has run out. Further, in a state where the tape cassette 30 is stored in the cassette storage 19, as shown in FIG. 7B, in the conveying direction X on the conveying path C, the optical sensor 42 and the light source 43 are arranged at positions facing substantially a center in the medium width direction Y of the print medium M and the ink ribbon R. In the conveyance object, a region facing the light receiving region 42a of the optical sensor 42 is the detection position S shown in FIG. 10A. Here, the cassette storage 19 is capable of storing a plurality of types of tape cassettes 30 having mutually different widths of the print medium M. The cassette storage 19 is configured such that a center in the medium width direction Y of the print medium M is substantially constant regardless of which of the plurality of types of tape cassettes 30 having mutually different widths of the print medium M is stored in the cassette storage 19. This causes the optical sensor 42 and the light source 43 to be arranged at positions facing substantially a center in the medium width direction Y of the print medium M, regardless of which of the plurality of types of tape cassettes 30 having mutually different widths of the print medium M is stored in the cassette storage 19. Therefore, it is possible to satisfactorily determine the presence or absence of a remaining amount of the print medium M, and detect replacement of the tape cassette 30 regardless of the width of the print medium M.

As shown in FIG. 6, in the tape end detector 41 disposed with the optical sensor 42 and the light source 43, the optical sensor 42 and the light source 43 are arranged such that a distance between the tape end detector 41 and the print medium M is substantially a predetermined interval (d1) in a direction facing the base material B via the release film F when the print medium M has the release film F in the print medium M, or via the substantially transparent adhesive material A when the print medium M does not have the release film F. In the present embodiment, the interval (d1) is set to about 4 to 6 mm Further, as shown in FIGS. 7A and 7B, the optical sensor 42 and the light source 43 are arranged on the tape end detector 41 at a predetermined interval (d2). In the present embodiment, the interval (d2) is set to about 1 to 3 mm.

The light source 43 is formed by, for example, a white LED. When the optical sensor 42 detects a color or color brightness of the conveyance object, the light source 43 irradiates the conveyance object with illumination light, that is, the light source 43 illuminates the conveyance object at the detection position S. The light source 43 is to emit light including a wavelength range that can be detected by the optical sensor 42 according to sensitivity characteristics of the optical sensor 42. That is, the light source 43 is not limited to a white LED as long as it can emit light including a desired wavelength range. For example, the light source 43 may be constituted of LEDs of three colors of red (R), green (G), and blue (B), and may be an incandescent lamp or a fluorescent lamp.

The optical sensor 42 is a detector configured to detect the print medium M and the ink ribbon R that are located at a position facing the light receiving region 42a. When the print medium M and the ink ribbon R are layered and arranged to face the optical sensor 42, light emitted for detection from the light source 43 disposed near the optical sensor 42 is reflected by the print medium M arranged closer to the light source 43 than the ink ribbon R. Specifically, when the print medium M has the release film F, the irradiation light is reflected by the release film F on an opposed surface, while the irradiation light is reflected by the opaque base material B through the adhesive material A that is transparent to the light of the light source 43 when the print medium M does not have the release film F.

In the former case, the reflected light becomes light corresponding to a color or color brightness of the release film F and is incident on the optical sensor 42. In the latter case, the reflected light becomes light corresponding to a color or color brightness of the base material B and is incident on the optical sensor 42. In either case, the processor 5 or the processor 5a determines that the print medium M is at a position facing the optical sensor 42, from incident light on the optical sensor 42 corresponding to the color or color brightness of the conveyance object.

Whereas, when the ink ribbon R is disposed to face the optical sensor 42, and the print medium M has been entirely conveyed and is not arranged to face the optical sensor 42, the light emitted for detection from the light source 43 disposed near the optical sensor 42 is hardly reflected by the print medium M, but is reflected by the ink ribbon R to be incident on the optical sensor 42 or absorbed by the ink ribbon R so as not to be incident on the optical sensor 42.

In this case, the optical sensor 42 detects reflected light corresponding to a color or color brightness of the ink ribbon R as incident light, or does not detect light having an amount of light enough to recognize that the print medium M is opposingly disposed. In either case, the processor 5 or the processor 5a detects that the print medium M is not at a position facing the optical sensor 42 and the ink ribbon R is at the position facing the optical sensor 42.

As described above, from the detection result such as the state of incident light on the optical sensor 42 or the presence or absence of incident light, it is possible to determine whether or not the print medium M remains at the position facing the optical sensor 42.

The ink ribbon R and the print medium M respectively have unique colors different from each other, and each color is defined by an RGB value.

When the tape cassette 30 is stored in the cassette storage 19, the ink ribbon R and the print medium M as the conveyance object to be conveyed are disposed on a side where one each surface is opposed to the optical sensor 42. The optical sensor 42 has a color sensor configured to include a photodiode having filters of respective colors of, for example, a red value (R), a green value (G), and a blue value (B). In this case, the optical sensor 42 outputs color information as a detection signal having an RGB value obtained by converting intensity of light detected by each photodiode into a 16-bit digital value, for example.

This allows the optical sensor 42 to detect mutually different RGB values for respective colors even if the color of the print medium M and the color of the ink ribbon R are similar to each other, since there is a difference in each material and there is no case where the print medium M and the ink ribbon R have exactly the same color. As a detection result, the optical sensor 42 detects an RGB value including a red value (R), a green value (G), and a blue value (B) of the color of the conveyance object in the region facing the optical sensor 42, on the conveyance object. The optical sensor 42 transmits the detected RGB value as a detection signal to the processor 5 or the processor 5a. Therefore, even if the color of the print medium M and the color of the ink ribbon R are similar to each other, the processor 5 or the processor 5a can determine that the conveyance object at the position facing the light receiving region 42a of the optical sensor 42 has been changed from the print medium M to the ink ribbon R, based on a change in the RGB value for the color of the conveyance object, detected by the optical sensor 42.

Further, the tape end detector 41 has a configuration for detecting whether or not the tape cassette 30 storing the print medium M has been replaced. The optical sensor 42 of the tape end detector 41 transmits the RGB value of the color of the ink ribbon R of the tape cassette 30 in a state where a remaining amount of the print medium M has run out before replacement, and the RGB value of the color of the print medium M of another tape cassette 30 after replacement, as a detection signal to the processor 5 or the processor 5a.

The processor 5 or the processor 5a determines, based on the detection result of the optical sensor 42, whether the conveyance object at the detection position S is in a state where the print medium M is layered on the ink ribbon R (hereinafter referred to as "first state"), or in a state where the print medium M is not layered on the ink ribbon R (hereinafter referred to as "second state"). In step S106, the processor 5 or the processor 5a stores the first detection result detected by the optical sensor 42 for the conveyance object at the detection position S after conveyance in S104 (described later), according to the result of step S105.

Based on a detection result (hereinafter referred to as "second detection result") detected by the optical sensor 42 in a subsequent step S101 before conveyance, the processor 5 or the processor 5a determines whether or not the conveyance object is in the second state, in step S102.

In addition, based on comparison between the second detection result detected by the optical sensor 42 before conveyance, and a new first detection result detected by the optical sensor 42 after new conveyance after the second detection result, the processor 5 or the processor 5a determines whether the conveyance object is in the first state or in the second state at the detection position S.

Therefore, in the tape cassette 30, since the RGB value of the print medium M and the RGB value of the ink ribbon R are different from each other, the processor 5 or the processor 5a can determine that the conveyance object at the position facing the light receiving region 42a of the optical sensor 42 has changed from the ink ribbon R to the print medium M, based on a change in the RGB value for the color of the conveyance object, detected by the optical sensor 42. After the detection of the RGB value of the color of the ink ribbon R, the conveyance object located at the position facing the light receiving region 42a of the optical sensor 42 does not change to the RGB value of the color of the print medium M unless the tape cassette 30 is replaced.

When the processor 5 or the processor 5a determines that the conveyance object is in the second state at the detection position S, the processor 5 or the processor 5a determines that the remaining amount of the print medium M has run out. The processor 5 or the processor 5a performs a control to stop conveyance by a conveyance motor drive circuit 11 until the tape cassette 30 is replaced.

When a difference (change rate) is equal to or more than a predetermined threshold value, between at least one value of the red value, the green value, and the blue value of the RGB value of the first detection result after conveyance of the conveyance object, and at least one corresponding value of the red value, the green value, and the blue value of the RGB value of the second detection result before conveyance, the processor 5 or the processor 5*a* determines that there is no remaining amount in the tape cassette 30. Further, when a difference (change rate) is less than a predetermined threshold value, between at least one value of the red value, the green value, and the blue value of the RGB value of the second detection result after the first detection result, and at least one corresponding value of the red value, the green value, and the blue value of the RGB value of the held value, the processor 5 or the processor 5*a* determines that there is no remaining amount in the tape cassette 30.

The optical sensor 42 may be configured to detect color brightness of the conveyance object instead of the RGB value. In other words, the optical sensor 42 may be configured to detect a difference in color brightness levels due to a difference in reflectance of an irradiation surface illuminated by the light source 43. In this case, based on the detected color brightness, it is determined that a detection object has changed from the print medium M to the ink ribbon R. In addition to the color sensor, the optical sensor 42 may be formed of a sensor such as a charge-coupled device (CCD) image sensor, a complementary MOS (CMOS) image sensor, or an infrared sensor, that can distinguish at least one of a color and color brightness of the print medium M as the conveyance object, and at least one of a color and color brightness of the ink ribbon R.

In a state where the tape cassette 30 is stored in the cassette storage 19, as shown in FIG. 6, a plurality of engagement parts 37 provided in the cassette case 31 are respectively supported by the plurality of cassette receivers 20 provided in the cassette storage 19, and the thermal head 10 is inserted into the thermal head inserted part 36 formed in the cassette case 31. Further, the tape core 32 of the tape cassette 30 is engaged with the tape core engaging shaft 22, and the ink ribbon winding drive shaft 23 is engaged with the ink ribbon winding core 35.

When a user inputs an instruction for starting printing to the printer 1, it is determined whether there is a tape remaining amount based on the detection result of the optical sensor 42. When it is determined that there is a tape remaining amount, the print medium M is fed out from the tape core 32 by a rotation of the platen roller 21. At this time, as the ink ribbon winding drive shaft 23 synchronously rotates with the platen roller 21, the ink ribbon R is fed out from the ink ribbon supply core 34 together with the print medium M. This causes conveyance of the print medium M and the ink ribbon R in a layered state near the tape end detector 41 and near the thermal head 10. That is, when there is a remaining amount of the print medium M in the tape cassette 30, the conveyance object is conveyed in the first state where the ink ribbon R is layered on the printing surface side of the base material B. Then, when passing between the thermal head 10 and the platen roller 21, the ink ribbon R is heated by the thermal head 10, whereby the ink is transferred to the print medium M and printing is performed.

A used portion of the ink ribbon R having passed between the thermal head 10 and the platen roller 21 is wound around the ink ribbon winding core 35. Whereas, a printed portion of the print medium M having passed between the thermal head 10 and the platen roller 21 is appropriately cut as required and discharged from the discharge port 2*a* when reaching a half-cutting device 16 and a full-cutting device 17 located on a downstream side in the conveying direction X.

In the present embodiment, the length of the ink ribbon R is formed to be longer than the length of the print medium M. Since the end E of the print medium M is not fixed to the tape core 32, the end E of the print medium M passes in front of the optical sensor 42 and is finally discharged from the discharge port 2*a*. Whereas, since both ends of the ink ribbon R are fixed to the ink ribbon supply core 34 and the ink ribbon winding core 35, the end of the ink ribbon R is not exposed outside the tape cassette 30, or does not pass in front of the optical sensor 42. That is, the print medium M is not layered on the ink ribbon R, and the conveyance object is the ink ribbon R alone. That is, when the remaining amount of the print medium M in the tape cassette 30 has run out, the print medium M is not layered on the ink ribbon R, and the conveyance object is conveyed in the second state with the ink ribbon R alone.

In the present embodiment, the tape end detector 41 disposed with the optical sensor 42 is disposed on the cassette storage 19 side. Therefore, the optical sensor 42 detects the color or color brightness of the conveyance object from the print medium M side, between the print medium M and the ink ribbon R that are conveyed in a layered state. The optical sensor 42 detects the color or color brightness of the conveyance object at the detection position S.

Therefore, when the print medium M remains, the optical sensor 42 detects the color or color brightness of the print medium M (the release film F when the print medium M has the release film F, or the base material B when the print medium M does not have the release film F). Then, after the print medium M is conveyed, and the end (boundary) E of the print medium M passes the position (detection position S) facing the optical sensor 42, the optical sensor 42 detects the color or color brightness of the ink ribbon R. Based on a change in the color or color brightness detected by the optical sensor 42 during conveyance of the conveyance object, the processor 5 or the processor 5*a* can determine that the end E of the print medium M has already passed the detection position S and the remaining amount of the print medium M has run out, by recognizing that the detection object by the optical sensor 42 has changed from the print medium M to the ink ribbon R. The processor 5 or the processor 5*a* may be configured to determine that the remaining amount of the print medium M has run out when the color or color brightness of the ink ribbon R is detected regardless of the change in the color or color brightness detected by the optical sensor 42 during conveyance of the conveyance object.

FIG. 8 is a block diagram showing a hardware configuration of the printer 1 and the electronic device 100. In addition to the thermal head 10, the thermistor 13, the half-cutting device 16, the full-cutting device 17, and the platen roller 21 that are described above, the printer 1 includes: the processor 5; a read only memory (ROM, second storage device) 6; a random access memory (RAM, first storage device) 7; a communication interface (IF) 8; a head drive circuit 9; the conveyance motor drive circuit 11 (conveying device); a stepping motor 12; a cutter motor drive circuit 14; a cutter motor 15; and the power circuit 40. At least the processor 5, the ROM 6, and the RAM 7 constitute a computer of the printer 1.

The processor 5 includes the processor 5a such as a central processing unit (CPU), for example. The processor 5 or the processor 5a controls an operation of each part of the printer 1 by developing, in the RAM 7, a program stored in the ROM 6, and executing the program.

The processor 5 or the processor 5a supplies, for example, a control signal (strobe signal, latch signal and clock signal) and print data to the head drive circuit 9, and controls the thermal head 10 via the head drive circuit 9. Further, the processor 5 or the processor 5a controls a motor (the stepping motor 12 and the cutter motor 15) via the motor drive circuit (the conveyance motor drive circuit 11 and the cutter motor drive circuit 14).

Based on a change in a color or color brightness of the conveyance object detected by the optical sensor 42 during conveyance of the conveyance object, the processor 5 or the processor 5a determines whether or not the end E, which is one of the boundaries of the print medium M, has already passed the detection position S, that is, whether or not there is a remaining amount of the print medium M. Specifically, when the optical sensor 42 detects the color of the conveyance object, the processor 5 or the processor 5a determines whether or not there is a remaining amount of the print medium M based on whether or not at least one value of the red value (R), the green value (G), and the blue value (B) included in the RGB value detected by the optical sensor 42 has changed by a predetermined rate or more. Based on the color information of the release film F and the color information of the ink ribbon R that are detected by the optical sensor 42, the processor 5 or the processor 5a determines whether or not the end E of the print medium M has already passed the detection position S, that is, whether or not there is a remaining amount. Thus, it can be determined whether or not there is a remaining amount of the print medium M. Details of the determination as to whether or not there is a remaining amount of the print medium M by the processor 5 or the processor 5a will be described later.

The ROM 6 stores a printing program to perform printing on the print medium M, and various data (e.g., font and the like) required for executing the printing program. The ROM 6 also serve as a recording medium storing a program that can be read by the processor 5 or the processor 5a. The ROM 6 has a flash memory capable of holding and storing data even when the power is OFF. When the power supply is turned OFF, the ROM 6 temporarily stores a held value of an RGB value. The held value will be described later. The RAM 7 includes a print data storage unit that stores data (hereinafter referred to as print data) indicating a pattern of print contents. The RAM 7 includes a display data storage unit that stores display data. Further, the RAM 7 stores an RGB value and a held value of an RGB value called from the ROM 6. The communication interface 8 exchanges data with a storage device of an external device (e.g., the electronic device 100) or of an external server through wired communication or wireless communication.

The head drive circuit 9 drives the thermal head 10 based on the control signal and print data that are supplied from the processor 5 or the processor 5a. The thermal head 10 is a print head having a plurality of heating elements 10a arranged in a main scanning direction. During an energization period specified by the strobe signal supplied from the processor 5 or the processor 5a, the head drive circuit 9 selectively applies a voltage to one of the plurality of heating elements 10a according to the print data output from the head drive circuit 9, whereby one of the plurality of heating elements 10a generates heat to heat the ink ribbon R. This causes the thermal head 10 to print one line at a time on the print medium M by thermal transfer. That is, the printer 1 is a thermal line printer.

The conveyance motor drive circuit 11 drives the stepping motor 12. The stepping motor 12 rotates the platen roller 21. The platen roller 21 is a conveyance mechanism that rotates with the power of the stepping motor 12 and conveys the print medium M in the length direction (sub scanning direction) of the print medium M.

The cutter motor drive circuit 14 drives the cutter motor 15. The half-cutting device 16 and the full-cutting device 17 operate with the power of the cutter motor 15, and respectively half-cut and full-cut the print medium M. The full cut is an operation of cutting the base material B of the print medium M together with the release film F along the width direction, while the half cut is an operation of cutting the base material B along the width direction without cutting the release film F. The power circuit 40 is a power supply unit that generates an output voltage from a direct current voltage (e.g., 24 V) from the external power source D, and supplies electric power to each part of the printer 1.

As shown in FIGS. 1 and 8, the electronic device 100 includes a display device 101 and an input device 102, and the electronic device 100 is, for example, a portable computer such as a smartphone or a tablet terminal. The display device 101 may be, for example, a liquid crystal display or an organic electroluminescence (organic EL) display. The input device 102 has, for example, a touch panel.

In addition to the above configuration, the electronic device 100 further includes a display-part driving device 103, a communication interface (IF) 104 capable of communicating with the printer 1, a ROM 105, a RAM 106, and a processor 107. The display-part driving device 103 is, for example, a liquid crystal display driver circuit or an organic EL display driver circuit. The processor 107 includes a processor 108. The processor 108 is a computation unit, and executes an application program to display a message sent from the printer 1 on the display device 101 and accept a touch operation by a user on the input device 102.

Figure 9:
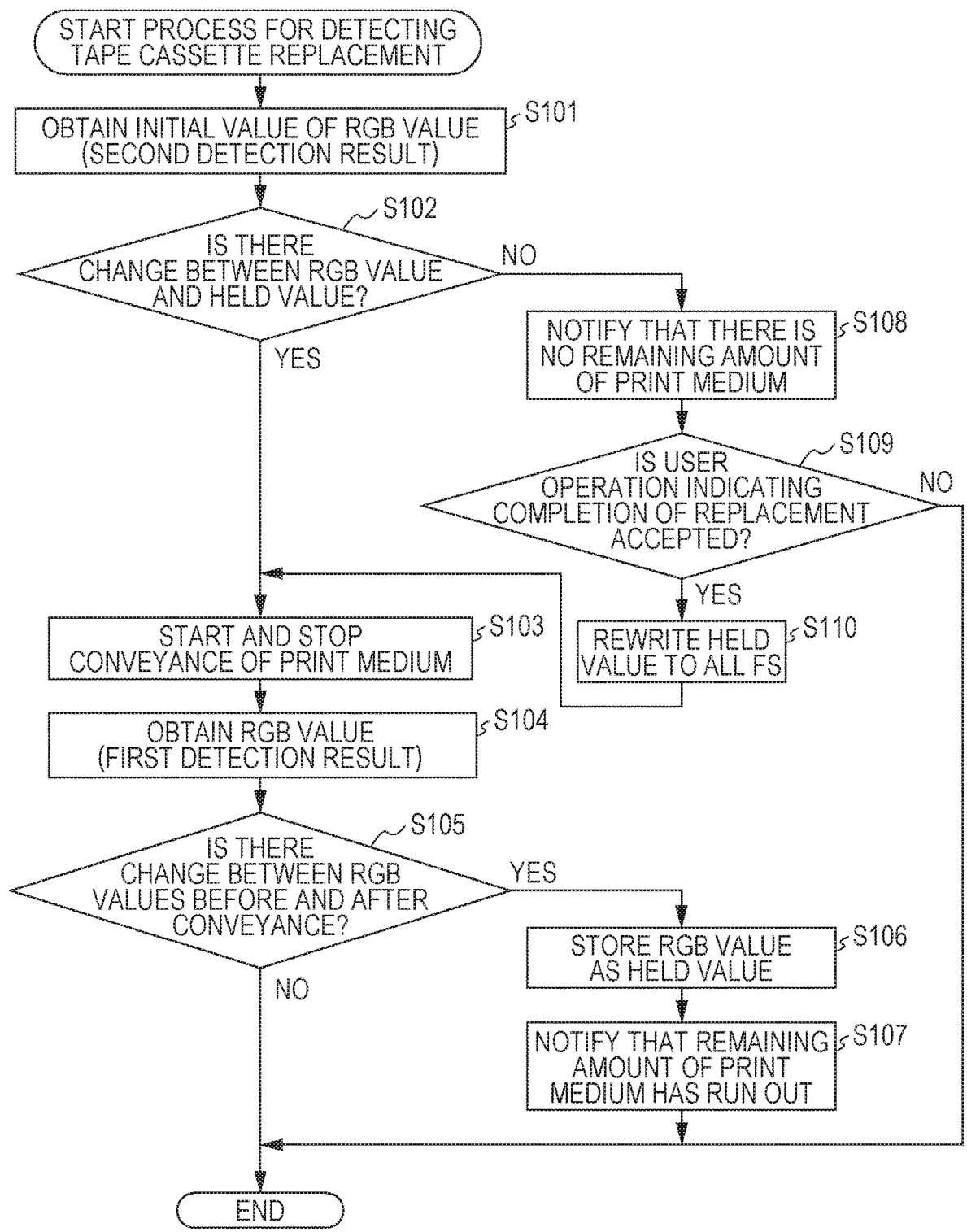
FIG. 9 is a flowchart of a process for detecting tape cassette replacement.
Figure 10A:
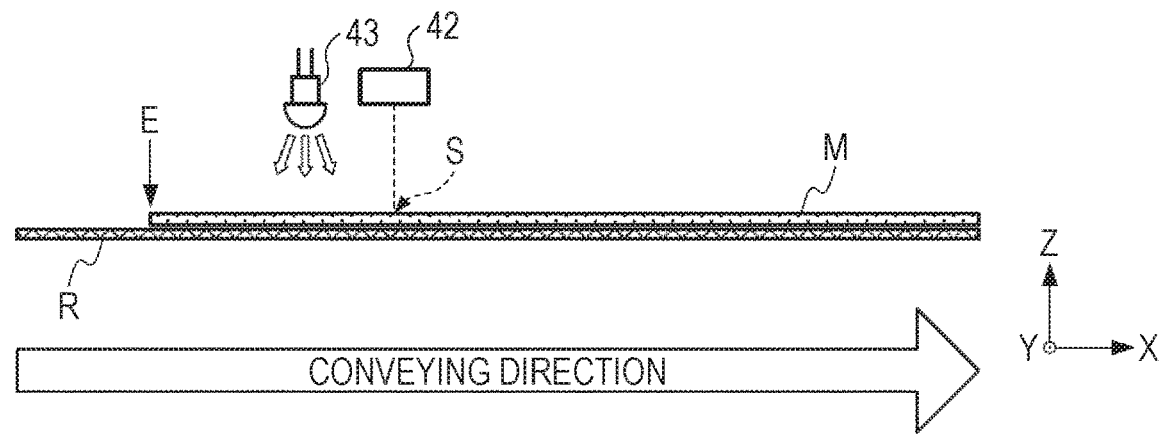
FIGS. 10A to 10C are views showing a conveyance state of the print medium and an ink ribbon, and a positional relationship with the optical sensor and the light source.
Figure 10B:
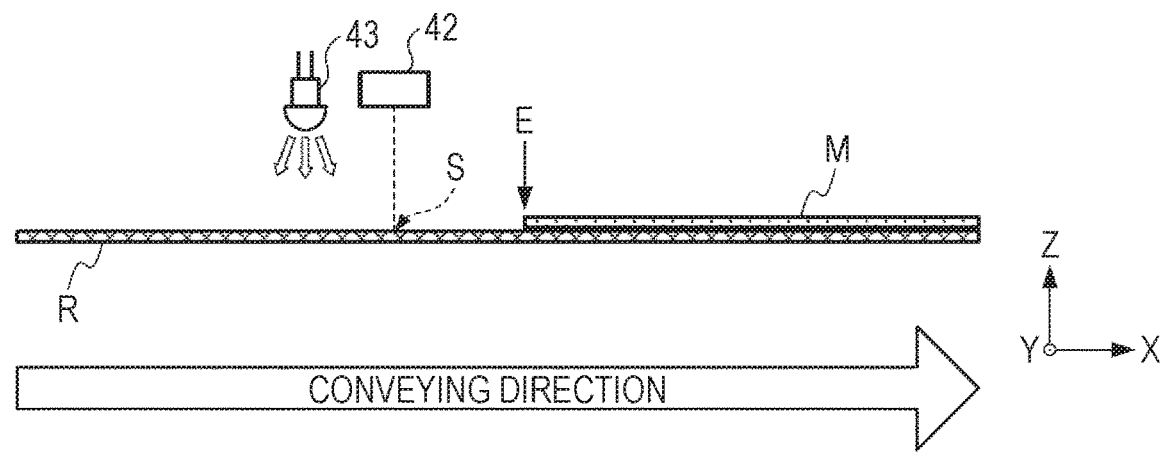
Figure 10C:
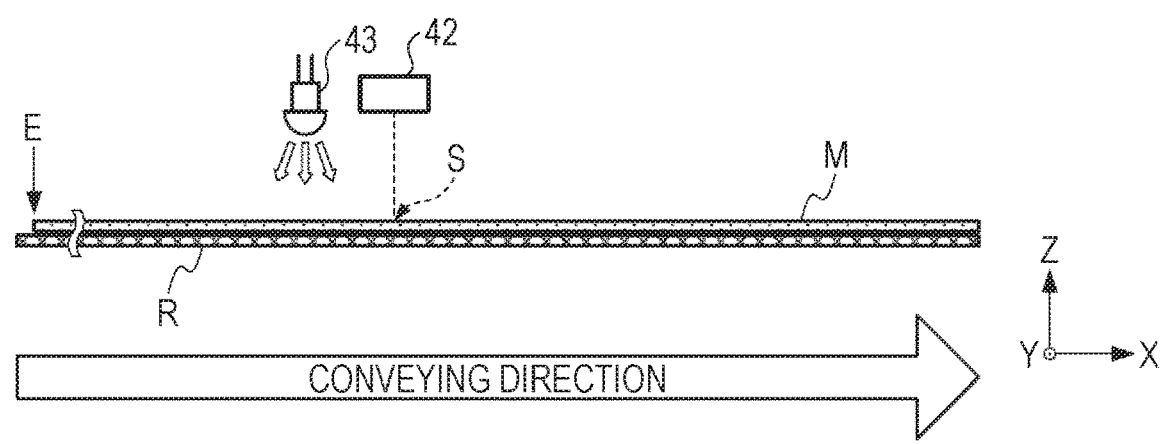

FIG. 9 is a flowchart of a process for detecting tape cassette replacement. The process for detecting tape cassette replacement will be described with reference to FIGS. 10A to 10C. FIGS. 10A to 10C are views showing a conveyance state of the print medium M and the ink ribbon R, and a positional relationship with the optical sensor 42 and the light source 43. Here, it is assumed that the print medium M has the release film F. For example, at least a surface of the release film F on the optical sensor 42 side has a light blue color. The base material B has, for example, any color of white, yellow, green, red, black, transparent, blue, pink, and silver. The ink ribbon R has a color of, for example, black, red, blue, golden, silver, or white. FIG. 10A is a schematic view illustrating a state before the end E of the print medium M passes the detection position S by the optical sensor 42 on the conveying path C, which is a conveyance state of the print medium M and the ink ribbon R of the tape cassette 30 before replacement, as viewed from the width direction Y. FIG. 10B is a schematic view illustrating a state after the end E of the print medium M has passed the detection position S by the optical sensor 42, which is a conveyance state of the print medium M and the ink ribbon R of the tape cassette 30 before replacement, as viewed from the width direction Y. FIG. 10C is a schematic view illustrating a state before the end E of the print medium M passes the detection position S by the optical sensor 42 on the conveying path C, which is a conveyance state of the print medium M and the ink ribbon R of a new tape cassette 30 after replacement, as viewed from the width direction Y. In the following, a case will be described where the optical sensor 42 detects a color of the conveyance object at the detection position S. However, even when the optical sensor 42 detects color brightness of the conveyance object at the detection position S, the process can be similarly performed simply by replacing color information with color brightness information.

In the process for detecting tape cassette replacement, a process is performed to detect whether or not the tape cassette 30 has been replaced with a new tape cassette 30 when a remaining amount in the tape cassette 30 storing a printing tape as the print medium M has run out.

In performing the process for detecting tape cassette replacement, for example, the ROM 6 of the printer 1 in a factory shipment state stores information of all Fs (0×FFFF_FFFF) as held values ($R_{keep}$, $G_{keep}$, $B_{keep}$) of the RGB value. The held values ($R_{keep}$, $G_{keep}$, $B_{keep}$) of the RGB value in the all Fs (0×FFFF_FFFF) are RGB values different from any of the RGB values of all types of the print mediums M and of all types of the ink ribbons R stored in the tape cassette 30 that can be stored in the cassette storage 19. When the power is ON after factory shipment, the processor 5 or the processor 5a calls and stores, in the RAM 7, the held values ($R_{keep}$, $G_{keep}$, $B_{keep}$) of the RGB value stored in the ROM 6. In a case where the ROM 6 stores the held values ($R_{keep}$, $G_{keep}$, $B_{keep}$) of the RGB value of the factory shipment state without storing the held values ($R_{keep}$, $G_{keep}$, $B_{keep}$) of other RGB values, the processor 5 or the processor 5a calls and stores, in the RAM 7, information of all Fs stored in the ROM 6, as the held values ($R_{keep}$, $G_{keep}$, $B_{keep}$) of the RGB value.

When the ROM 6 stores the held values ($R_{keep}$, $G_{keep}$, $B_{keep}$) of the RGB value that has been stored in the step S106 (described later), the processor 5 or the processor 5a calls and stores, in the RAM 7, the held values ($R_{keep}$, $G_{keep}$, $B_{keep}$) of the RGB value stored in the ROM 6. Meanwhile, the case where the ROM 6 stores the held values ($R_{keep}$, $G_{keep}$, $B_{keep}$) of the RGB value of other than the factory shipment state indicates a state where the processor 5 or the processor 5a has determined that the print medium M in the tape cassette 30 has run out.

After the previous step S106, the printer 1 starts a current process for detecting tape cassette replacement shown in FIG. 9 based on an instruction to start printing from a user. In the process for detecting tape cassette replacement, the processor 5 or the processor 5a first operates the optical sensor 42 before conveyance of the print medium M, and obtains, as initial values, the RGB values ($R_{before}$, $G_{before}$, $B_{before}$) of the detection signal as the second detection result detected by the optical sensor 42 (step S101).

At this time, when the print medium M remains as in the case of FIG. 10A, the end E of the print medium M is located on an upstream side from the detection position S by the optical sensor 42, in the conveying direction of the print medium M on the conveying path C. Further, as shown in FIG. 10C, when the tape cassette 30 is replaced with another new one, the end E of the print medium M is located on the upstream side from the detection position S by the optical sensor 42, in the conveying direction of the print medium M on the conveying path C.

Therefore, the case where the print medium M remains before conveyance of the print medium M in step S103 in the same process for detecting tape cassette replacement as in the above-described step S101 indicates a state where a remaining amount of the print medium M originally remains, or a state where the tape cassette 30 has been replaced with another tape cassette 30 having a remaining amount of the print medium M, after notification that the remaining amount of the print medium M has run out in step S107 in the (previous) process for detecting tape cassette replacement performed before the (current) process for detecting tape cassette replacement.

In this case, the print medium M and the ink ribbon R are present in a layered state at the detection position S by the optical sensor 42, and the optical sensor 42 faces the release film F of the print medium M. Therefore, in step S101, the optical sensor 42 detects an RGB value including a red value (R), a green value (G), and a blue value (B) corresponding to a color of the release film F of the print medium M at the detection position S, and outputs the RGB value as a detection signal to the processor 5 or the processor 5a. Then, the processor 5 or the processor 5a obtains the red value (R), the green value (G), and the blue value (B) included in the RGB value of the detection signal transmitted from the optical sensor 42 as initial values $R_{before}$, $G_{before}$, $B_{before}$ respectively, and stores the red value (R), the green value (G), and the blue value (B) in the RAM 7.

On the other hand, as shown in FIG. 10B, when there is no remaining amount of the print medium M, for example, the print medium M after conveyance, it can be seen that the end E of the print medium M is located on a downstream side from the detection position S by the optical sensor 42 in the conveying direction X of the print medium M on the conveying path C. When there is no remaining amount of the print medium M before conveyance of the print medium M, notification that the remaining amount of the print medium M has run out is provided in the previous step S107, but it is indicated that the tape cassette 30 has not yet been replaced with another new tape cassette 30 having a remaining amount of the print medium M. In this case, the ink ribbon R alone exists at the detection position S by the optical sensor 42 without the print medium M, and the optical sensor 42 faces the ink ribbon R. Therefore, in step S101, the optical sensor 42 detects an RGB value including a red value (R), a green value (G), and a blue value (B) corresponding to a color of the ink ribbon R at the detection position S, and outputs the RGB value as a detection signal to the processor 5 or the processor 5a. Then, the processor 5 or the processor 5a obtains the red value (R), the green value (G), and the blue value (B) included in the RGB value of the detection signal transmitted from the optical sensor 42 as initial values $R_{before}$, $G_{before}$, and $B_{before}$ respectively, and stores the red value (R), the green value (G), and the blue value (B) in the RAM 7.

At a time of the current step S101 before conveyance of the print medium M after the optical sensor 42 outputs the detection signal of the RGB value including the red value (R), the green value (G), and the blue value (B) corresponding to a color of the ink ribbon R, after the previous step S106, when the detection signal of the RGB value corresponding to the color of the ink ribbon R as the second detection result detected by the optical sensor 42 is input, the processor 5 or the processor 5a determines whether or not there is a change (step S102) based on a comparison result of the RGB values ($R_{before}$, $G_{before}$, $B_{before}$) as the second detection result with the held values ($R_{keep}$, $G_{keep}$, $B_{keep}$) of the RGB value as the first detection result stored in the RAM 7 at the previous step S106.

In this process, the processor 5 or the processor 5a determines a rate of the change between the respective values of the initial values $R_{before}$, $G_{before}$, and $B_{before}$ of the RGB value before conveyance of the print medium M obtained in the current step S101, and the respective values of the held values $R_{keep}$, $G_{keep}$, and $B_{keep}$ of the RGB value stored in step S106 of the previous process for detecting tape cassette replacement performed before step S101 of the current process for detecting tape cassette replacement. That is, the processor 5 or the processor 5a determines a rate of change of $R_{before}$ to $R_{keep}$, a rate of change of $G_{before}$ to $G_{keep}$, and a rate of change of $B_{before}$ to $B_{keep}$.

The processor 5 or the processor 5a determines whether or not at least any one value of the red value (R), the green value (G), and the blue value (B) included in the RGB value obtained in step S101 has changed by a predetermined rate (threshold value) or more, that is, whether or not at least any one value has changed by a predetermined threshold value or more as a result of comparing the RGB values. In the present embodiment, the threshold value is set to, for example, 10%.

The processor 5 or the processor 5a determines whether or not at least one of the following (Expression 1) to (Expression 3) is satisfied.

$$(R_{before}\text{-}R_{keep})/R_{keep}) \geq 0.1 \qquad \text{(Expression 1)}$$

$$(G_{before}\text{-}G_{keep})/G_{keep}) \geq 0.1 \qquad \text{(Expression 2)}$$

$$(B_{before}\text{-}B_{keep})/B_{keep}) \geq 0.1 \qquad \text{(Expression 3)}$$

The threshold value is not limited to this value, and can be set to any rate for each type of the tape cassette 30. For example, in a tape cassette 30 having a width with multiple kinds of combinations of color variations between the print medium M and the ink ribbon R, the threshold value can be set lower. Whereas, in a tape cassette 30 having a width having less combinations of color variations between the print medium M and the ink ribbon R, the threshold value can be set higher.

When NO is returned in step S105 (described later) of the previous process for detecting tape cassette replacement, the held value is not updated and remains as a previous held value since the RGB value is a value that becomes color information of a release film F of the print medium M. The previous held value is a value that becomes information of all Fs (0×FFFF_FFFF) or a value that becomes color information of the ink ribbon R. Further, in the previous step S106 (described later) continuing from the previous step S105 returning YES, the held value is updated and stored to be a value that becomes color information of the ink ribbon R after conveyance, as the previous held value. Therefore, the previous held value remains as a value that becomes information of all Fs (9×FFFF_FFFF) or a value that becomes color information of the ink ribbon R, and the previous held value does not become a value indicating color information of the release film F of the print medium M.

Then, in the step S101 of the current process for detecting tape cassette replacement of after the previous one while the previous step S105 has returned NO, the initial values ($R_{before}$, $G_{before}$, $B_{before}$) of the RGB value are a values indicating color information of the release film F of the print medium M, and the current step S102 returns YES if the tape cassette 30 has not been replaced between the end of the previous process for detecting tape cassette replacement and the current step S101.

In the step S101 of the current process for detecting tape cassette replacement of after the previous one while the previous step S105 has returned NO, the initial values ($R_{before}$, $G_{before}$, $B_{before}$) of the RGB value are in accordance with a tape remaining amount in the replaced tape cassette 30, if the tape cassette 30 has been replaced between the end of the previous process for detecting tape cassette replacement and the current step S101.

If the previous step S105 returns YES, and the tape cassette 30 has not been replaced between the end of the previous process for detecting tape cassette replacement and the current step S101 after the previous step S106, the initial values ($R_{before}$, $G_{before}$, $B_{before}$) of the RGB value are values indicating color information of the ink ribbon R, and the current step S102 returns NO.

If the previous step S105 returns YES, and the tape cassette 30 has been replaced between the end of the previous process for detecting tape cassette replacement and the current step S101 after the previous step S106, the initial values ($R_{before}$, $G_{before}$, $B_{before}$) of the RGB value are in accordance with a tape remaining amount in the replaced tape cassette 30.

As described above, for at least any one of the above-described (Expression 1) to (Expression 3), when the initial values ($R_{before}$, $G_{before}$, $B_{before}$) of the RGB value in the current step S101 are values indicating color information of the release film F of the print medium M, the current step S102 returns YES, while the current step S102 returns NO when the initial values are values indicating the color information of the ink ribbon R.

When there is a change by a threshold value or more between the initial value of the RGB value detected by the optical sensor 42 before conveyance of the print medium M and the held value of the RGB value stored in the RAM 7 (YES in step S102), the processor 5 or the processor 5a determines that the RGB value obtained before conveyance of the print medium M indicates color information of the release film F of the print medium M.

In this case, the processor 5 or the processor 5a determines that the end E of the print medium M has not yet passed the detection position S on the conveying path C. This causes the processor 5 or the processor 5a to determine that the tape cassette 30 has been replaced with another tape cassette 30 having a remaining amount of the print medium M, or that there has originally been a remaining amount of the print medium M.

When the power is first turned ON after the factory shipment state, the held values ($R_{keep}$, $G_{keep}$, $B_{keep}$) of the RGB value are all Fs (0×FFFF_FFFF) and therefore satisfy (Expression 1) to (Expression 3). Thus, the processor 5 or the processor 5a always determines that the tape cassette 30 has been replaced with another tape cassette 30 having a remaining amount of the print medium M, or that there has originally been a remaining amount of the print medium M.

Then, after YES is returned in step S102 or after step S110 (described later), the processor 5 or the processor 5a turns ON the thermal head 10 and turns ON the stepping motor 12. This causes the platen roller 21 to rotate in the conveying direction, starts conveyance of the print medium M, and causes printing to be performed on the print medium M based on print data. When the printing based on the print data is completed, the processor 5 or the processor 5a turns OFF the thermal head 10 and turns OFF the stepping motor 12. This stops the rotation of the platen roller 21, also ends conveyance of the print medium M, and also ends printing on the print medium M (step S103).

When conveyance of the print medium M is completed, the processor 5 or the processor 5a operates the optical sensor 42 after the end of conveyance of the print medium M, and obtains an RGB value of a detection signal detected by the optical sensor 42 (step S104).

At this time, when the print medium M still remains even after conveyance of print medium M as in the case of FIG. 10A, the end E of the print medium M is to be located on the upstream side from the detection position S by the optical sensor 42, in the conveying direction X of the print medium M on the conveying path C, while the print medium M and the ink ribbon R exist in a layered state at the detection position S by the optical sensor 42, and the optical sensor 42 faces the release film F of the print medium M. Therefore, the optical sensor 42 detects an RGB value including a red value (R), a green value (G), and a blue value (B) corresponding to a color of the release film F of the print medium M at the detection position S, and outputs the RGB value as a detection signal to the processor 5 or the processor 5a. Then, the processor 5 or the processor 5a obtains the red value (R), the green value (G), and the blue value (B) included in the RGB value of the detection signal transmitted from the optical sensor 42, as the RGB values $R_{after}$, $G_{after}$, and $B_{after}$ respectively, after the end of conveyance of the print medium M.

On the other hand, as shown in FIG. 10B, when the remaining amount of the print medium M has run out after conveyance of the print medium M, the end E of the print medium M is to be located on the downstream side from the detection position S by the optical sensor 42, in the conveying direction of the print medium M on the conveying path C. In this case, the ink ribbon R alone exists at the detection position S by the optical sensor 42 without the print medium M, and the optical sensor 42 faces the ink ribbon R. Therefore, the optical sensor 42 detects an RGB value including a red value (R), a green value (G), and a blue value (B) corresponding to a color of the ink ribbon R at the detection position S, and transmits the RGB value as a detection signal to the processor 5 or the processor 5a. Then, the processor 5 or the processor 5a obtains the red value (R), the green value (G), and the blue value (B) included in the RGB value of the detection signal transmitted from the optical sensor 42, as the RGB values $R_{after}$, $G_{after}$, and $B_{after}$ respectively, after the end of conveyance of the print medium M.

Subsequently, based on comparison of the initial values ($R_{before}$, $G_{before}$, $B_{before}$) (the second detection result of this time) of the RGB value detected by the optical sensor 42 before current conveyance of the print medium M, with the RGB values ($R_{after}$, $G_{after}$, $B_{after}$) (the first detection result of this time) detected by the optical sensor 42 after the end of the current conveyance of the print medium M, the processor 5 or the processor 5a determines whether or not there is a change (step S105).

In this process, the processor 5 or the processor 5a determines a rate of the change between the respective values of the initial values $R_{before}$, $G_{before}$, and $B_{before}$ of the RGB value before conveyance of the print medium M obtained in the step S101, and the respective values of the RGB values $R_{after}$, $G_{after}$, and $B_{after}$ after conveyance of the print medium M obtained in step S104. That is, the processor 5 or the processor 5a determines a rate of change of $R_{after}$ to $R_{before}$, a rate of change of $G_{after}$ to $G_{before}$, and a rate of change of $B_{after}$ to $B_{before}$.

The processor 5 or the processor 5a determines whether or not at least any one value of the red value (R), the green value (G), and the blue value (B) included in the RGB value has changed by a predetermined rate (threshold value) or more. Specifically, the processor 5 or the processor 5a determines whether or not at least any one value of the red value (R), the green value (G), or the blue value (B) included in the RGB value has changed by a predetermined threshold value or more, that is, whether or not at least any one value has changed by a predetermined threshold value or more as a result of comparing the RGB values. In the present embodiment, the threshold value is set to, for example, 10%. The threshold value is not limited to this value, and can be set to any rate.

That is, the processor 5 or the processor 5a determines whether or not at least one of the following (Expression 4) to (Expression 6) is satisfied.

$(R_{after}-R_{before})/R_{before})\geq 0.1$       (Expression 4)

$(|G_{after}-R_{before}|/G_{before})\geq 0.1$       (Expression 5)

$(|B_{after}-B_{before}|/B_{before})\geq 0.1$       (Expression 6)

Since the RGB value before conveyance is a value of the color information of the release film F of the print medium M either when YES is returned in step S102 or in step S110, the RGB value does not become the RGB value including the red value (R), the green value (G), and the blue value (B) corresponding to a color of the ink ribbon R. Therefore, at least any one of the above-mentioned (Expression 4) to (Expression 6) is set such that NO is returned in step S105 when the RGB values $R_{after}$, $G_{after}$, and $B_{after}$ in step S104 indicate the color information of the release film F of the print medium M, while YES is returned in step S105 when the RGB values indicate the color information of the ink ribbon R.

When there is no change by the threshold value or more between the RGB values obtained before and after conveyance of the print medium M (NO in step S105), the processor 5 or the processor 5a determines that the RGB values obtained before and after conveyance of the print medium M indicate the color information of the release film F of the print medium M. In this case, the processor 5 or the processor 5a determines that the end E of the print medium M has not yet passed the detection position S on the conveying path C. This causes the processor 5 or the processor 5a to determine that there is still a remaining amount of the print medium M. Upon completion of this process, the process for detecting tape cassette replacement is completed.

On the other hand, when there is a change by the threshold value or more between the RGB values obtained before and after conveyance of the print medium M (YES in step S105), the processor 5 or the processor 5a determines that the RGB value obtained after conveyance of the print medium M indicates the color information of the ink ribbon R, rather than indicating the color information of the release film F of the print medium M. That is, based on the change in the color information detected by the optical sensor 42, the processor 5 or the processor 5a determines that the conveyance object at the detection position S has changed from the release film F of the print medium M to the ink ribbon R. This causes the processor 5 or the processor 5a to determine that the end E of the print medium M has passed the detection position S on the conveying path C, and to determine that the remaining amount of the print medium M has run out.

When detecting that the remaining amount of the print medium M has run out based on the RGB values respectively detected before and after conveyance of the print medium M, the processor 5 or the processor 5a causes the RAM 7 to store the RGB values $R_{after}$, $G_{after}$, and $B_{after}$, which have been obtained in step S104, in the second state after the end of conveyance of the print medium M, as held values $R_{keep}$, $G_{keep}$, and $B_{keep}$ (first detection result) (step S106). That is, the processor 5 or the processor 5a stores, in the RAM 7, the RGB values $R_{after}$, $G_{after}$, and $B_{after}$ as the detection result detected by the optical sensor 42 after the end of conveyance of the print medium M, as the held values $R_{keep}$, $G_{keep}$, and $B_{keep}$ of the RGB value of the print medium M, which are the detection result detected by the optical sensor 42 when it is detected that the remaining amount of the print medium M has run out.

When the processor 5 or the processor 5a determines that the remaining amount of the print medium M has run out, for example, the processor 5 or the processor 5a performs control to notify that the remaining amount of the print medium M has run out (step S107) such as by displaying an error message indicating that the remaining amount of the print medium M has run out on the display device 101 of the electronic device 100, or outputting a message sound indicating that the remaining amount of the print medium M has run out, with a speaker (not shown) of the electronic device 100. For example, the processor 5 or the processor 5a performs control to cause the display device 101 of the electronic device 100 to display that "Printing tape has run out. Please replace the tape cassette" as an error message. This enables clear notification to a user that the tape cassette 30 is required to be replaced since the remaining amount of the print medium M has run out. When an instruction to start printing is issued again after step S107, and the process for detecting tape cassette replacement is started, an initial value of the RGB value is obtained again in step S101. If the tape cassette 30 has not been replaced from after step S107 to before step S101, the processor 5 or the processor 5a determines that there is no change between the initial value and the held value of the RGB value (NO in step S102) in the processing of step S102, and the conveyance by the conveyance motor drive circuit 11 is temporarily stopped. When the power of the printer 1 is turned OFF after the end of step S107, the ROM 6 stores the held values $R_{keep}$, $G_{keep}$, $B_{keep}$ as the first detection result stored in the RAM 7 in step S106.

When there is no change by a threshold value or more between the initial value of the RGB value detected by the optical sensor 42 before conveyance of the print medium M and the held value of the RGB value stored in the RAM 7 (NO in step S102), the processor 5 or the processor 5a determines that the RGB value obtained as the initial value before conveyance of the print medium M and the RGB value stored as the held value both indicate color information of the ink ribbon R of the print medium M. In this case, in processing of step S105, the processor 5 or the processor 5a determines that the tape cassette 30 has not been replaced yet although it is determined that the remaining amount of the print medium M has run out after the end E of the print medium M has passed the detection position S.

If the processor 5 or the processor 5a determines that the tape cassette 30 has not been replaced yet although the remaining amount of the print medium M has run out, for example, the processor 5 or the processor 5a performs control to notify that there is no remaining amount of the print medium M (step S108) such as by displaying an error message indicating that there is no remaining amount of the print medium M on the display device 101 of the electronic device 100, or outputting a message sound indicating that there is no remaining amount of the print medium M, with a speaker (not shown) of the electronic device 100. For example, the processor 5 or the processor 5a performs control to cause the display device 101 of the electronic device 100 to display that "There is no printing tape. Please replace the tape cassette" as an error message. This enables clear notification to a user that the tape cassette 30 is required to be replaced since there is no remaining amount of the print medium M.

Depending on a combination in which the color of the print medium M and the color of the ink ribbon R are similar, there is a possibility that erroneous determination is made that the color information detected by the optical sensor 42 has not been changed, depending on the threshold value, in step S102. That is, since the print medium M has the release film F, the optical sensor 42 basically detects the color (e.g., light blue) of the release film F as a conveyance object when there is a remaining amount of the print medium M. However, depending on a color of the adhesive material A or of the base material B, since the color of the ink ribbon R, the adhesive material A, or the base material B is seen through the release film F to some extent, the detection result of the color of the release film F may be different from the color of the release film F itself. For example, in a combination of a light-blue release film F of the print medium M and a black ink ribbon R, the possibility of erroneous determination is less because the color of the print medium M (release film F) and the color of the ink ribbon R are largely different. Whereas, in a combination of a light-blue release film F of the print medium M and a transparent ink ribbon R, it has been found that the difference between the color of the print medium M (release film F) and the color of the ink ribbon R becomes relatively small. In this case, erroneous determination may be made because the difference in detection result by the optical sensor 42 is small.

In this case, the processor 5 or the processor 5a may erroneously determine that the tape cassette 30 has not been replaced since the processor 5 or the processor 5a is unable to detect that the conveyance object at the detection position S has changed from the release film F of the print medium M to the ink ribbon R, even though the tape cassette 30 has been replaced. In order to solve an issue of such erroneous determination disabling printing, the processor 5 or the processor 5a determines whether or not that a user operation indicating a replacement completion of the tape cassette 30 has been accepted (step S109). For example, the processor 5 or the processor 5a performs control to display a message "Tape cassette has been replaced" and an icon "[YES] or [NO]" on the display device 101 of the electronic device 100. Based on the user operation on the input device 102 of the electronic device 100, the processor 5 or the processor 5a determines whether or not the operation (e.g., a touch operation on the icon "YES") indicating a replacement completion of the tape cassette 30 has been accepted.

When the operation indicating a replacement completion of the tape cassette 30 has been accepted (YES in step S109), the processor 5 or the processor 5a determines that the processing of step S102 has been erroneous determination. That is, the processor 5 or the processor 5a determines that detail of determination that there is no change by a threshold value or more between the initial value of the RGB value obtained before conveyance of the print medium M and the held value of the RGB value stored in the RAM 7 has been erroneous detection, and that the tape cassette 30 has been replaced with another tape cassette 30 having a remaining amount of the print medium M.

In this case, the processor 5 or the processor 5a rewrites the held values ($R_{keep}$, $G_{keep}$, $B_{keep}$) of the RGB value stored in the RAM 7 to all Fs (0xFFFF_FFFF) (step S110). If erroneous determination is made, another erroneous detection can be avoided by returning the held value of the RGB value to the factory shipment state, so that it is considered that the tape cassette 30 has been replaced since the held value satisfies Expressions 1 to 3 even if the held value is compared with the initial value of the next RGB value. This makes it possible to eliminate troublesome user operations. Subsequently, the processor 5 or the processor 5a proceeds to processing of step S103, performs conveyance and printing of the print medium M, and executes the process in and after step S104.

When the operation (e.g., a touch operation on the icon of [NO]) indicating a replacement incompletion of the tape cassette 30 has not been accepted after step S108 (NO in step S109), the processor 5 or the processor 5a determines that the processing of step S102 has not been erroneous determination. That is, the processor 5 or the processor 5a determines that detail of determination that there is no change by a threshold value or more between the initial value of the RGB value obtained before conveyance of the print medium M and the held value of the RGB value stored in the RAM 7 has not been erroneous determination, and that the tape cassette 30 has not been replaced with another tape cassette 30 having a remaining amount of the print medium M. In this case, the processor 5 or the processor 5a and terminates the process for detecting tape cassette replacement without proceeding the process to step S103, and without performing conveyance and printing of the print medium M.

That is, the processor 5 or the processor 5a repeatedly executes processing of steps S101, S102, S108, and S109 when the tape cassette 30 has not been replaced yet although it has been determined that the remaining amount of the print medium M has run out. Therefore, the print medium M is not conveyed and printed until the tape cassette 30 is replaced with another tape cassette 30 having a remaining amount of the print medium M. This can eliminate empty printing by the thermal head 10 and cutting failure in advance, and can protect components of the printer 1 such as the thermal head 10 and the platen roller 21.

After the end of the process for detecting tape cassette replacement, when the power button 25 is pressed based on a user operation to turn OFF the power, the processor 5 or the processor 5a transfers, to the ROM 6, the held values ($R_{keep}$, $G_{keep}$, $B_{keep}$) of the RGB value stored in the RAM 7 and temporarily stores the held values. Since the ROM 6 is formed by a flash memory, the held values ($R_{keep}$, $G_{keep}$, $B_{keep}$) of the RGB value are continuously retained even when the power is turned OFF. Then, when the power is turned ON again, the processor 5 or the processor 5a can execute the process for detecting tape cassette replacement by using the determination result of the previous RGB value, by calling and storing, in the RAM 7, the held values of the RGB value stored in the ROM 6.

In the printer 1 configured as described above, it is detected whether or not the tape cassette 30 has been replaced based on a comparison result of a detection result of a color or color brightness of the conveyance object detected by the optical sensor 42 before conveyance of the print medium M, with a detection result of a color or color brightness of the conveyance object detected by the optical sensor 42 and stored when it is determined that the remaining amount of the print medium M has run out. Since it is determined whether or not the tape cassette 30 has been replaced based on the comparison result with the stored detection result, even when the tape cassette 30 storing the print medium M is replaced while the power is OFF, it is possible to detect whether or not the tape cassette 30 has been replaced when the power is turned ON afterward. Further, it is possible to detect whether or not the tape cassette 30 storing the print medium has been replaced, without any processing on the print medium M. Further, since it is detected whether or not the tape cassette 30 has been replaced based on the difference in color information between the ink ribbon R and the print medium M, this detection result can be less susceptible to influences of external light, environmental changes such as temperature change, and the like. Furthermore, since it is detected whether or not the tape cassette 30 has been replaced based on a change in a color or a change in color brightness, it is possible to detect whether or not the tape cassette 30 has been replaced even when a combination of any color, material, and structure is adopted in the relationship between the print medium M and the ink ribbon R. For example, it is possible to detect whether or not the tape cassette 30 has been replaced, even if the structure of the print medium M does not have the release film F.

Further, based on a comparison result of a detection result of a color or color brightness of the conveyance object detected by the optical sensor 42 before conveyance of the print medium M, with a detection result of a color or color brightness of the conveyance object detected by the optical sensor 42 after conveyance, the processor 5 or the processor 5a determines whether or not the end E of the print medium M has already passed the detection position. This enables detection as to whether or not a remaining amount of the print medium M has run out, even if the ink ribbon R and the print medium M have similar colors.

Further, when the optical sensor 42 is to detect a color, the processor 5 or the processor 5a detects whether or not the tape cassette 30 has been replaced, based on whether or not there has been a change by a predetermined rate or more, in at least any one value in RGB values including a red value (R), a green value (G), and a blue value (B) detected by the optical sensor 42. This enables detection as to whether or not the tape cassette 30 having no remaining amount of the print medium M is replaced with a tape cassette 30 having a remaining amount of the print medium M, even if a color of the print medium M of the tape cassette 30 before replacement and a color of the ink ribbon R of the tape cassette 30 after replacement are similar.

Further, when the optical sensor 42 is to detect a color, the processor 5 or the processor 5a determines the presence or absence of a remaining amount of the print medium M stored in the tape cassette 30 based on whether or not there has been a change by a predetermined rate or more, in at least any one value in RGB values including a red value (R), a green value (G), and a blue value (B) detected by the optical sensor 42. This enables determination of the presence or absence of a remaining amount of the print medium M stored in the tape cassette 30, for example, even if the ink ribbon R and the print medium M have similar colors.

Further, the optical sensor 42 detects color information of the print medium M and the color information of the ink ribbon R on an irradiation surface irradiated by the light source 43. Therefore, even in an environment of dark surroundings, it is possible to distinguish and detect the print medium M and the ink ribbon R. This allows improvement of a detection accuracy for replacement of a tape cassette 30 having no remaining amount of the print medium M with a tape cassette 30 having a remaining amount of the print medium M.

Further, since the print medium M and the ink ribbon R are each made of different materials, reflectance is different from each other even if the colors of the print medium M and the ink ribbon R are similar. Therefore, it is possible to distinguish and detect the print medium M and the ink ribbon R through the difference in color brightness due to the difference in reflectance. This allows improvement of a detection accuracy for replacement of a tape cassette 30 having no remaining amount of the print medium M with a tape cassette 30 having a remaining amount of the print medium M.

In a case of the tape cassette 30 in which the print medium M does not have the release film F, it is sufficient to replace all "release films F" in the above embodiment with "base material B".

Second Embodiment

Hereinafter, a second embodiment will be described. A hardware configuration of a printer 1 and an electronic device 100 according to the second embodiment is similar to that of the first embodiment, and thus description thereof is omitted. In the first embodiment, immediately after obtaining the initial value of the RGB value, the processor 5 or the processor 5*a* determines whether or not there is a change in the RGB value based on the comparison result between the initial value of the RGB value and the held value of the RGB value stored in the RAM 7. In this regard, in the second embodiment, there is provided a flag area to store an RGB value flag in a RAM 7. When determining that a conveyance object is in a second state at a detection position S, a processor 5 or a processor 5*a* turns ON a flag in the flag area, while the processor 5 or the processor 5*a* turns OFF the flag when determining that the conveyance object is not in the second state at the detection position S. A difference is that the processor 5 or the processor 5*a* does not compare a second detection result with a stored first detection result when the flag is ON.

Information of ON and OFF of the RGB value flag is stored in the RAM 7. The RGB value flag is information indicating whether or not there is a remaining amount of a print medium M in a tape cassette 30. A state where the RGB value flag is ON indicates a state where there is no remaining amount of the print medium M and the tape cassette 30 has not been replaced. Next, with reference to FIG. 11, a process for detecting tape cassette replacement of the second embodiment will be described.

Figure 11:
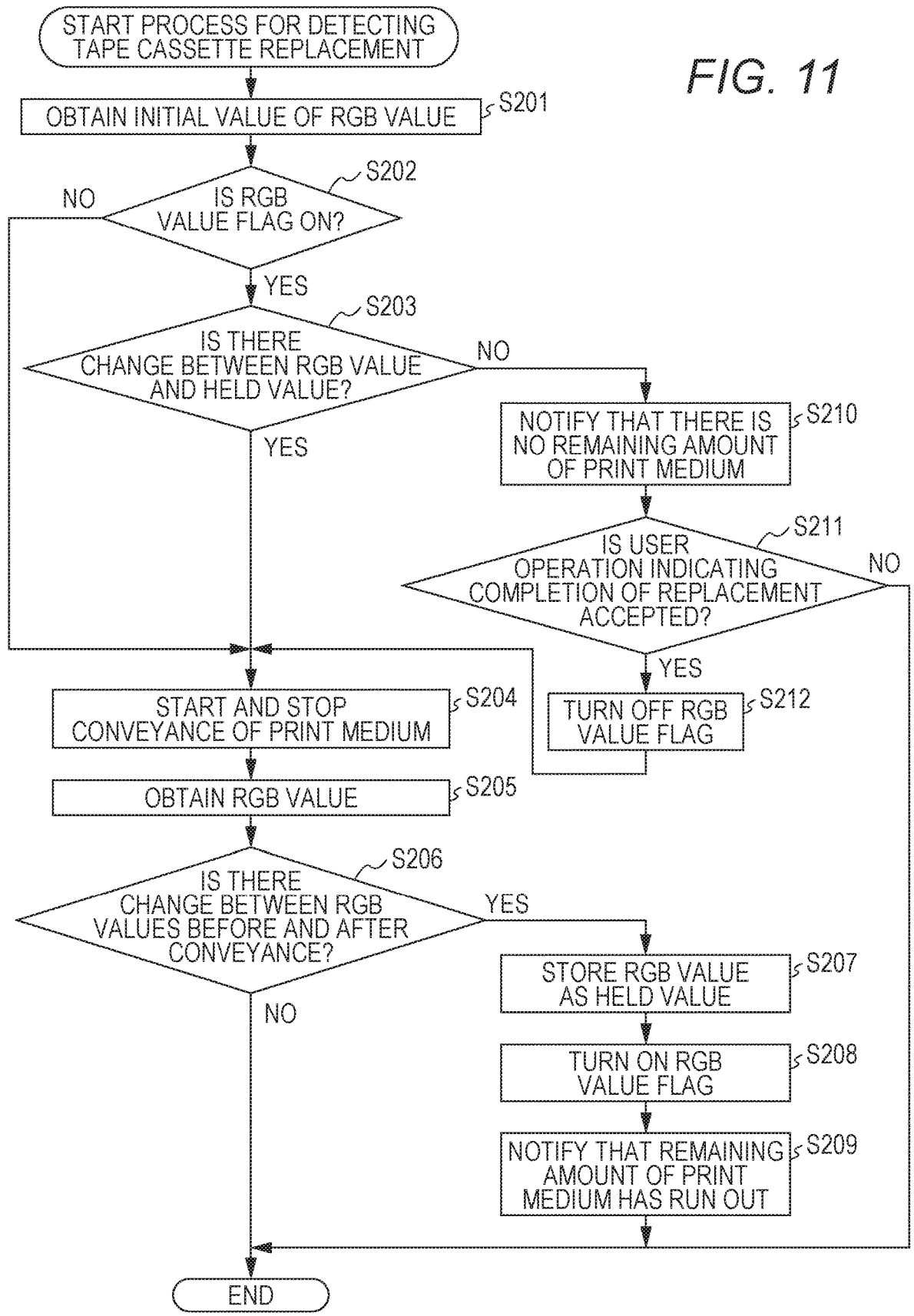
FIG. 11 is a flowchart of a process for detecting tape cassette replacement according to a second embodiment.

FIG. 11 is a flowchart of the process for detecting tape cassette replacement according to the second embodiment. The process for detecting tape cassette replacement of the second embodiment is basically the same as the flowchart of the process for detecting tape cassette replacement of the first embodiment in FIG. 9. Since processing of steps S201, S204 to S207, and S210 to S211 of the second embodiment is the same as the processing of steps S101, S103 to S106, and S108 to S109 of the first embodiment, descriptions are omitted and the differences alone are explained.

In executing the process for detecting tape cassette replacement, in the process for detecting tape cassette replacement of the second embodiment, when the power is ON, the processor 5 or the processor 5*a* calls and stores RGB value flag information in the RAM 7, in addition to held values ($R_{keep}$, $G_{keep}$, $B_{keep}$) of an RGB value stored in a ROM 6. In a factory shipment state, information of the RGB value flag OFF is stored. When information in factory shipment state is stored as the RGB value flag information, the processor 5 or the processor 5*a* calls and stores, in the RAM 7, the information of the RGB value flag OFF stored in the ROM 6. When the ROM 6 stores information of the RGB value flag ON stored in step S208 (described later), the processor 5 or the processor 5*a* calls and stores, in the RAM 7, the information of the RGB value flag ON stored in the ROM 6.

When an RGB value of a detection signal detected by an optical sensor 42 is obtained as an initial value (step S201), the processor 5 or the processor 5*a* refers to the RAM 7 and determines whether or not the RGB value flag is ON (step S202). In this process, after the determination that the remaining amount of the print medium M has run out (YES in step S206), the processor 5 or the processor 5*a* detects whether the tape cassette 30 has not been replaced yet. When the RGB value flag is ON (YES in step S202), the process proceeds to step S203. On the other hand, when the RGB value flag is OFF (not ON) (NO in step S202), the processor 5 or the processor 5*a* proceeds to processing of step S204 without executing processing of step S203. This enables omission of the processing of step S203 for determining a rate of change of the RGB value if there is still a remaining amount of the print medium M in the tape cassette 30, allowing reduction of a processing load on the processor 5 or the processor 5*a*.

Moving on to the description of step S207, when the RAM 7 stores RGB values $R_{after}$, $G_{after}$, and $B_{after}$ after the end of conveyance of the print medium M respectively as held values $R_{keep}$, $G_{keep}$, $B_{keep}$, the processor 5 or the processor 5*a* turns ON the RGB value flag (step S208). In this process, the processor 5 or the processor 5*a* sets the RGB value flag to ON as information indicating determination that the remaining amount of the print medium M has run out (NO in step S206).

Moving on to the description of step S211, when an operation indicating a replacement completion of the tape cassette 30 has been accepted (YES in step S211), the processor 5 or the processor 5*a* determines that the processing of step S203 has been erroneous determination. That is, the processor 5 or the processor 5*a* determines that detail of determination that there is no change by a threshold value or more between the initial value of the RGB value obtained before conveyance of the print medium M and the held value of the RGB value stored in the RAM 7 has been erroneous detection, and that the tape cassette 30 has been replaced with another tape cassette 30 having a remaining amount of the print medium M.

In this case, the processor 5 or the processor 5*a* turns OFF the RGB value flag stored in the RAM 7 (step S212). If erroneous determination is made, another erroneous detection can be avoided by returning the held value of the RGB value to the factory shipment state, even if the held value is compared with the initial value of the next RGB value. This makes it possible to eliminate troublesome user operations. Subsequently, the processor 5 or the processor 5*a* proceeds to the processing of step S204, performs conveyance and printing of the print medium M, and executes processing of steps S205 to S209.

After the end of the process for detecting tape cassette replacement, when the power button 25 is pressed based on a user operation to turn OFF the power, the processor 5 or the processor 5*a* transfers, to the ROM 6, RGB value flag information and temporarily stores the information, in addition to the held values ($R_{keep}$, $G_{keep}$, $B_{keep}$) of the RGB value stored in the RAM 7. Since the ROM 6 is formed by a flash memory, the held values ($R_{keep}$, $G_{keep}$, $B_{keep}$) of the RGB value and the RGB value flag information are continuously retained even when the power is turned OFF. Then, when the power is turned ON again, the processor 5 or the processor 5*a* can execute the process for detecting tape cassette replacement by using the determination result of the previous RGB value and the RGB value flag information, by calling and storing, in the RAM 7, the held values of the RGB value and the RGB value flag information stored in the ROM 6. This enables detection as to whether or not the tape cassette 30 has been replaced when the power is turned ON afterward, even when the tape cassette 30 storing the print medium M is replaced while the power is OFF. Furthermore, determining based on the RGB value flag allows determination as to whether or not there is still the remaining amount of the print medium M in the tape cassette 30, which can eliminate unnecessary processing and can reduce a processing load on the processor 5 or the processor 5a.

The above-described embodiments show specific examples for easy understanding of the invention, and the present invention is not limited to these embodiments. Various modifications and changes can be made to the printer, the printing control method of the printer, and the recording medium without departing from the scope of the claims.

In the above-described embodiment, the processor 5 or the processor 5a determines whether or not the tape cassette 30 has been replaced, based on comparison of the respective values of the initial values $R_{before}$, $G_{before}$, and $B_{before}$ of the RGB value before conveyance of the print medium M, with the respective values of the held values $R_{keep}$, $G_{keep}$, and $B_{keep}$ of the stored RGB value. However, in any tape cassette 30, the release film F has a same color, for example, light blue. Therefore, it may be determined whether the print medium M at the detection position S is the release film F or the ink ribbon R based on a value of the detection result of the optical sensor 42.

In the above-described embodiment, the processor 5 or the processor 5a temporarily stores the held value of the RGB value and the RGB value flag information in the ROM 6 formed by a flash memory when the power is OFF, but the present invention is not limited to this. For example, the processor 5 or the processor 5a may store the held value of the RGB value and the RGB value flag information in the ROM 105 of the electronic device 100 or a storage device on an external server via the communication IF 8 when the power is OFF.

In the above-described embodiment, the processor 5 or the processor 5a displays an error message on the display device 101 of the electronic device 100, but the present invention is not limited to this. For example, a display device such as a display or a light emitting diode may be provided on the printer 1, and a message may be displayed on the display device. For example, when the processor 5 or the processor 5a determines that there is no remaining amount of the print medium M, the processor 5 or the processor 5a may perform control to cause the display device of the printer 1 to display an error message indicating that there is no remaining amount of the print medium M of the tape cassette 30. Similarly, when the processor 5 or the processor 5a determines that the remaining amount of the print medium M has run out, the processor 5 or the processor 5a may perform control to cause the display device of the printer 1 to display an error message indicating that the remaining amount of the print medium M has run out. This enables clear notification to a user that there is no remaining amount of the print medium M and that the remaining amount has run out.

The above-described embodiment shows an example of determining the presence or absence of a remaining amount of the print medium M based on information of a color or color brightness of the print medium M detected by the optical sensor 42 and information of a color or color brightness of the ink ribbon R, but the present invention is not limited to this. For example, by forming the print medium M with multiple colors (e.g., three colors) for each length, the presence or absence of a remaining amount of the print medium M may be determined based on a difference between information of the color or color brightness of the print medium M (release film F) that varies with the length and information of the color or color brightness of the ink ribbon R. In this case, the processor 5 or the processor 5a performs control to display a message corresponding to the remaining amount.

The above-described embodiment shows an example of arranging the optical sensor 42 on the upstream side from the thermal head 10 in the conveying direction X of the print medium M on the conveying path C, but the present invention is not limited to this. For example, the optical sensor 42 may be arranged on a downstream side from the thermal head 10, for example, on the conveying path C on which the print medium M and the ink ribbon R are conveyed in a layered state.

The above-described embodiment shows an example in which the optical sensor 42 detects a color or color brightness of the print medium from the print medium M side, but the present invention is not limited to this. For example, by making a length of the print medium M longer than a length of the ink ribbon R, the end of the ink ribbon R may be detected before the optical sensor 42 detects the end E of the print medium M. In this case, the color or color brightness of the print medium may be detected by the optical sensor 42 from the ink ribbon R side.

In the above-described embodiment, the printer 1 and the electronic device 100 are separate from each other, but they may be integrated.

Several embodiments of the present invention have been described, but these embodiments are merely illustrative and do not limit the technical scope of the present invention. The present invention can adopt various other embodiments, and various modifications such as omission and replacement can be made without departing from the subject matter of the present invention. These embodiments and modifications thereof are included in the scope and subject matter of the invention described herein and the like, and are included in the invention described in the claims and the equivalent scope thereof.

What is claimed is:

1. A printer comprising:
    a print head that performs printing on a print medium of a conveyance object having the print medium and a member other than a print medium, the print medium and the member other than the print medium having mutually different colors included in respective regions at least on one side of each of the print medium and the member other than the print medium, or having mutually different levels of color brightness in respective regions at least on one side of each of the print medium and the member other than the print medium;
    a detector configured to detect a color or a color brightness of the conveyance object at a detection position; and
    a processor,
    wherein, when there is a change in the color or the color brightness as a first detection result detected by the detector after conveyance of the conveyance object, as compared with the color or the color brightness as a second detection result detected by the detector before conveyance of the conveyance object, the processor updates a held value indicating a value of the color or the color brightness of the conveyance object after conveyance, and the processor does not update the held value when there is no change, and then, the processor determines, in response to a print instruction and based on a new second detection result detected by the detector before new conveyance, whether there is a change in a detection value obtained by detecting a color or a color brightness of a conveyance object before the new conveyance, as compared with the held value updated according to the first detection result or a previous held value that has not been updated, and the processor regards that there is no remaining amount of the print medium and stops printing when determining that there is no change.

2. The printer according to claim 1, wherein in response to the print instruction, when the processor determines that there is a change in a second detection value obtained by detecting a color or a color brightness of the conveyance object before the new conveyance, as compared with the updated held value or a previous held value that has not been updated, the processor regards that there is a remaining amount of the print medium and performs printing.

3. The printer according to claim 1, wherein based on the first detection result or the second detection result, it is determined whether the conveyance object is in a first state in which the member other than the print medium and the print medium are layered at the detection position, or a second state in which the member other than the print medium and the print medium are not layered.

4. The printer according to claim 1, further comprising a storage that replaceably stores a storage body in which the conveyance object is stored,
wherein the detector is disposed on a side facing the one side of each of the print medium and the member other than the print medium.

5. The printer according to claim 1, wherein the detector detects an RGB value including a red value (R), a green value (G), and a blue value (B) of a color of the conveyance object at a region of the conveyance object facing the detector, as the first detection result or the second detection result; and
wherein the processor determines that there is a change when there is a change equal to or more than a predetermined threshold value, in at least one value among the red value, the green value, and the blue value in the first detection result after conveyance, with respect to at least one corresponding value among the red value, the green value, and the blue value in the second detection result before conveyance.

6. The printer according to claim 1, wherein the detector detects an RGB value including a red value (R), a green value (G), and a blue value (B) of a color of the conveyance object at a region of the conveyance object facing the detector, as the first detection result or the second detection result; and
wherein the processor determines that there is a change when there is a change equal to or more than a predetermined threshold value, in at least one value among the red value, the green value, and the blue value in the second detection result before conveyance, with respect to at least one corresponding value among the red value, the green value, and the blue value in the held value.

7. The printer according to claim 1, further comprising a first storage device to temporarily store data and a second storage device to hold and store the data even when power is OFF,
wherein the processor stores the held value in the first storage device, and
wherein the processor temporarily stores, in the second storage device, the held value stored in the first storage device when power is OFF, and the processor calls, in the first storage device, the held value temporarily stored in the second storage device when power is turned ON.

8. The printer according to claim 1, wherein the member other than the print medium comprises an ink ribbon that is used for the printing by the print head.

9. The printer according to claim 1, wherein the print medium is positioned at the detection position in a first state in which the print medium is layered with the member other than the print medium when there is a remaining amount of the print medium, while the member other than the print medium is positioned at the detection position in a second state in which the member other than the print medium is not layered with the print medium when there is no remaining amount of the print medium.

10. The printer according to claim 1, wherein the print medium comprises:
a long base material having a printing surface on one side; and
a release film positioned on an opposite surface to the printing surface of the long base material, and
wherein the detector detects a color or a color brightness of a side of the release film facing the detector when there is a remaining amount of the print medium.

11. The printer according to claim 1, wherein the member other than the print medium comprises an ink ribbon; and
wherein the detector detects a color or color brightness of a side of the ink ribbon facing the detector when there is no remaining amount of the print medium.

12. The printer according to claim 1, wherein
the detector is disposed on an upstream side in a conveying direction with respect to the print head, on a conveying path of the conveyance object.

13. A printer comprising:
a print head that performs printing on a print medium of a conveyance object having the print medium and a member other than a print medium, the print medium and the member other than the print medium having mutually different colors included in respective regions at least on one side of each of the print medium and the member other than the print medium, or having mutually different levels of color brightness in respective regions at least on one side of each of the print medium and the member other than the print medium;
a detector configured to detect a color or a color brightness of the conveyance object at a detection position;
a processor; and
a first storage device provided with a flag area,
wherein, when there is a change in the color or the color brightness as a first detection result detected by the detector after conveyance of the conveyance object, as compared with the color or the color brightness as a second detection result detected by the detector before conveyance of the conveyance object, the processor updates a held value indicating a value of the color or the color brightness of the conveyance object after conveyance and turns ON a flag in the flag area, and the processor does not update the held value when there is no change, and then, when the flag in the flag area is ON, in response to a print instruction and based on a new second detection result detected by the detector before new conveyance, the processor executes a determination process to determine whether there is a change in a detection value obtained by detecting a color or a color brightness of a conveyance object before the new conveyance, as compared with the held value updated according to the first detection result or a previous held value that has not been updated, and the processor regards that there is no remaining amount of the print medium and stops printing when determining that there is no change.

14. The printer according to claim 13, wherein
when the flag in the flag area is not ON, printing is performed as regarding that there is a remaining amount of the print medium, without performing the determination process.

15. A printing control method comprising:
updating a held value indicating a value of a color or a color brightness of a conveyance object after conveyance of the conveyance object when there is a change in the color or the color brightness as a first detection result detected by a detector after the conveyance of the conveyance object, as compared with the color or the color brightness as a second detection result detected by the detector before the conveyance of the conveyance object, but not updating the held value when there is no change, wherein the conveyance object comprises a print medium and a member other than a print medium, and the print medium and the member other than the print medium have mutually different colors included in respective regions at least on one side of each of the print medium and the member other than the print medium, or have mutually different levels of color brightness in respective regions at least on one side of each of the print medium and the member other than the print medium; and then,
determining, in response to a print instruction and based on a new second detection result detected by the detector before new conveyance, whether there is a change in a detection value obtained by detecting a color or a color brightness of a conveyance object before the new conveyance, as compared with the held value updated according to the first detection result or with a previous held value that has not been updated, and stopping printing as regarding that there is no remaining amount of the print medium when determining that there is no change.

16. A non-transitory computer-readable recording medium storing a program of a printer, the non-transitory computer-readable recording medium causing a computer to execute functions comprising:
updating a held value indicating a value of a color or a color brightness of a conveyance object after conveyance of the conveyance object when there is a change in the color or the color brightness as a first detection result detected by a detector after the conveyance of the conveyance object, as compared with the color or the color brightness as a second detection result detected by the detector before the conveyance of the conveyance object, but not updating the held value when there is no change, wherein the conveyance object comprises a print medium and a member other than a print medium, and the print medium and the member other than the print medium have mutually different colors included in respective regions at least on one side of each of the print medium and the member other than the print medium, or have mutually different levels of color brightness in respective regions at least on one side of each of the print medium and the member other than the print medium; and then,
determining, in response to a print instruction and based on a new second detection result detected by the detector before new conveyance, whether there is a change in a detection value obtained by detecting a color or a color brightness of a conveyance object before the new conveyance, as compared with the held value updated according to the first detection result or with a previous held value that has not been updated, and stopping printing as regarding that there is no remaining amount of the print medium when determining that there is no change.

* * * * *